United States Patent
Yoshimura et al.

(10) Patent No.: US 7,091,307 B2
(45) Date of Patent: Aug. 15, 2006

(54) COMPOSITION FOR OPTICAL MATERIAL

(75) Inventors: Yuichi Yoshimura, Mie (JP);
Motoharu Takeuchi, Tokyo (JP);
Hiroshi Horikoshi, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 172 days.

(21) Appl. No.: 10/398,188

(22) PCT Filed: Oct. 11, 2001

(86) PCT No.: PCT/JP01/08926

§ 371 (c)(1),
(2), (4) Date: Apr. 2, 2003

(87) PCT Pub. No.: WO02/33448

PCT Pub. Date: Apr. 25, 2002

(65) Prior Publication Data
US 2004/0122201 A1    Jun. 24, 2004

(30) Foreign Application Priority Data
Oct. 13, 2000 (JP) .............................. 2000-314385

(51) Int. Cl.
*C08G 75/06* (2006.01)
*C08G 75/30* (2006.01)
(52) U.S. Cl. ...................... 528/377; 528/378; 528/380; 528/381; 528/387; 528/388; 528/389
(58) Field of Classification Search ................ 528/377, 528/378, 380, 381, 387, 388, 389
See application file for complete search history.

(56) References Cited

U.S. PATENT DOCUMENTS

| | | | | |
|---|---|---|---|---|
| 6,124,424 A | * | 9/2000 | Okazaki et al. | 528/405 |
| 6,130,307 A | * | 10/2000 | Amagai et al. | 528/73 |
| 6,444,146 B1 | * | 9/2002 | Yoshimura et al. | 264/1.32 |
| 6,472,495 B1 | * | 10/2002 | Yoshimura et al. | 528/73 |
| 6,531,532 B1 | * | 3/2003 | Yoshimura et al. | 524/418 |
| 6,534,589 B1 | * | 3/2003 | Yoshimura et al. | 524/765 |
| 2004/0026658 A1 | * | 2/2004 | Yoshimura et al. | 252/183.11 |

FOREIGN PATENT DOCUMENTS

| EP | 785194 A1 | * 7/1997 |
|---|---|---|
| EP | 1 046 931 | 10/2000 |
| EP | 1 319 966 | 6/2003 |

OTHER PUBLICATIONS

Supplementary European Search Report mailed Apr. 5, 2004, for EP No. 01 97 4784.

* cited by examiner

*Primary Examiner*—Jeffrey B. Robertson
(74) *Attorney, Agent, or Firm*—Antonelli, Terry, Stout and Kraus, LLP.

(57) ABSTRACT

The present invention relates to a composition for optical materials, comprising (a) a compound having in one molecule at least one structure represented by the following Formula 1:

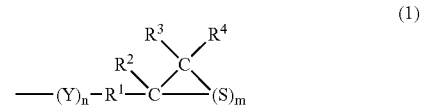

(1)

wherein $R^1$ is a single bond or a $C_{1-10}$ hydrocarbon group, each of $R^2$, $R^3$ and $R^4$ is a $C_{1-10}$ hydrocarbon group or hydrogen, Y is O, 5, Se or Te, m is 1 to 5, and n is 0 to 5; (b) a compound having in one molecule at least one isocyanate group and/or at least one isothiocyanate group; (c) a compound having in one molecule at least one mercapto group; and (d) an inorganic compound having sulfur atom and/or selenium atom, and also relates to an optical material produced by polymerization curing the composition, a production method thereof, and an optical lens comprising the optical material. The present invention provides a high refractive, high Abbe's number optical material having an improved impact resistance.

16 Claims, No Drawings

COMPOSITION FOR OPTICAL MATERIAL

TECHNICAL FIELD

The present invention relates to a composition suitable for producing an optical material such as plastic lens, prism, optical fiber, information recording medium, and filter, particularly, for producing a plastic spectacle lens. The present invention further relates to an optical material produced by polymerization curing the composition, a production method thereof, and an optical lens comprising the optical material.

BACKGROUND ART

Plastic materials are recently widely used in manufacturing optical materials, particularly, spectacle lenses because of their light weight, toughness and easiness of dyeing. Optical materials, particularly, spectacle lenses are required to have, in addition to a low specific gravity, a high refractive index and a large Abbe's number for optical properties, and a high heat resistance and a high impact resistance for physical properties. A large refractive index makes it possible to reduce the thickness of lens. A high Abbe's number reduces the chromatic aberration of lens. A high heat resistance and a high impact strength facilitate the fabrication process and are important in view of safety in use.

The inventors found a novel sulfur compound capable of providing a thin optical material having a low chromatic aberration, and filed applications for patent (Japanese Patent Application Laid-Open Nos. 9-71580, 9-110979 and 9-255781, and Japanese Patent Application No.2000-20627). The inventors further found a resin composition capable of enhancing the impact resistance, and filed applications for patent (Japanese Patent Application Laid-Open Nos. 11-292950 and 11-318960). However, the refractive index decreased with increasing impact resistance, because the component for improving the impact resistance, in turn, reduces the refractive index. Therefore, the novel sulfur compound, found by the inventors, capable of providing a thin optical material having a low chromatic aberration fails to exert its effect sufficiently in the resin composition having an improved impact resistance.

DISCLOSURE OF INVENTION

An object of the present invention is to provide a high refractive, high Abbe's number optical material having a higher impact resistance.

The present invention provides a composition for optical materials, comprising:

(a) a compound having in one molecule at least one structure represented by the following Formula 1:

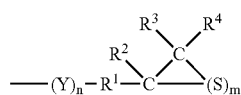

wherein $R^1$ is a single bond or a $C_{1-10}$ hydrocarbon group, each of $R^2$, $R^3$ and $R^4$ is a $C_{1-10}$ hydrocarbon group or hydrogen, Y is O, S, Se or Te, m is 1 to 5, and n is 0–5;

(b) a compound having in one molecule at least one isocyanate group and/or isothiocyanate group;

(c) a compound having in one molecule at least one mercapto group; and (d) an inorganic compound having sulfur atom and/or selenium atom.

The present invention further provides an optical material produced by polymerization curing the composition, a production method thereof, and an optical lens comprising the optical material.

BEST MODE FOR CARRYING OUT THE INVENTION

Each proportion of the compound (a), compound (b), compound (c) and compound (d) in the composition for optical materials is not determined unequivocally because it depends on the refractive index or viscosity of each compound and the properties of the resulting resin. To maintain a high refractive index, the total amount of the compound (a) and the compound (d) is preferably 5 to 95 parts by weight. To enhance the impact resistance, the total amount of the compound (b) and the compound (c) is preferably 5 to 95 parts by weight. If exceeding the above ranges, a high impact resistance intended by the present invention is not achieved. In addition, there occur several disadvantages such as insufficient heat resistance, discoloration of the cured product and failure in achieving one of the objects of the present invention, i.e., a high refractive index and a high Abbe's number. Preferably, the total amount of the compound (a) and the compound (d) is 5 to 95 parts by weight and the total amount of the compound (b) and the compound (c) is 5 to 95 parts by weight. More preferably, the total amount of the compound (a) and the compound (d) is 10 to 90 parts by weight and the total amount of the compound (b) and the compound (c) is 10 to 90 parts by weight. Most preferably, the total amount of the compound (a) and the compound (d) is 20 to 90 parts by weight and the total amount of the compound (b) and the compound (c) is 10 to 90 parts by weight.

To further enhance the impact resistance of the optical material obtained by polymerization curing, the compound (a) preferably has in one molecule two or more structure represented by Formula 1, and more preferably the compound (a) is represented by the following Formula 2:

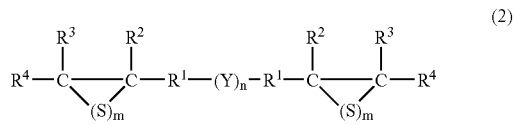

wherein $R^1$, $R^2$, $R^3$, $R^4$, Y, m and n are as defined in Formula 1; the compound (b) preferably has in one molecule two or more isocyanate groups and/or isothiocyanate groups; and the compound (c) preferably has in one molecule two or more mercapto groups.

To achieve a high refractive index, one of the objects of the present invention, $R^1$ of Formula 1 representing the compound (a) is preferably a $C_{0-2}$ hydrocarbon group, and each of $R^2$, $R^3$ and $R^4$ of Formula 1 is preferably hydrogen or methyl group. More preferably, $R^1$ is a $C_{0-1}$ hydrocarbon group, and each of $R^2$, $R^3$ and $R^4$ is hydrogen. A preferred compound (b) is one having a sulfur atom, and more preferred is one having a sulfide linkage. A preferred compound (c) is one having a sulfur atom in addition to a mercapto group, and more preferred is one having a sulfide linkage. The compound (d) is an inorganic compound. The inorganic compound referred to herein has the meaning described in "Standard Dictionary of Chemical Terms", compiled by The Chemical Society of Japan, 1991, Maruzen. Namely, as described in the above document, the inorganic compound referred to herein means compounds having no carbon atom and relatively simple compounds even when having carbon atom. Therefore, carbon disulfide, potassium thiocyanate, etc. which are generally not classified into organic compounds are regarded herein as inorganic compounds. The compound (d) is preferably at least one compound selected from the group consisting of sulfur, carbon disulfide, selenium, selenium sulfide and lead selenide.

The compound (a) includes any compounds having in one molecule at least one structure of Formula 1. Examples of preferred compounds are:

(A) Compounds having in one molecule at least one structure of Formula 1 wherein n is zero;
(B) Compounds having in one molecule at least one structure of Formula 1 wherein Y is O;
(C) Compounds having in one molecule at least one structure of Formula 1 wherein Y is S;
(D) Compounds having in one molecule at least one structure of Formula 1 wherein Y is Se; and
(E) Compounds having in one molecule at least one structure of Formula 1 wherein Y is Te.

The compounds (A), (B), (C), (D) and (E) are mainly constituted by a chain backbone, a branched backbone, an alicyclic backbone, an aromatic backbone or a heterocyclic backbone having nitrogen, oxygen, sulfur, selenium or tellurium. The compounds may have in one molecule two or more of these backbone structures simultaneously. The compounds may also have a sulfide linkage, a selenide linkage, a telluride linkage, an ether linkage, a sulfone linkage, a ketone linkage, an ester linkage, an amide linkage or a urethane linkage.

(A) Preferred examples of the compounds having in one molecule at least one structure of Formula 1 wherein n is zero include:

Organic compounds having aliphatic chain backbone:
1,1-bis(epithioethyl)methane, 1,1-bis(epithioethyl)methane, 1-(epithioethyl)-1-(β-epithiopropyl)methane, 1,1-bis(β-epithiopropyl)methane, 1-(βepithioethyl)-1-(β-epithiopropyl)ethane, 1,2-bis(β-epithiopropyl)ethane, 1,2-bis(β-epithiopropyl)ethane, 1-(epithioethyl)-3-(β-epithiopropyl)butane, 1,3-bis(,-epithiopropyl)propane, 1-(epithioethyl)-4-(β-epithiopropyl)pentane, 1,4-bis(β-epithiopropyl)butane, 1-(epithioethyl)-5-(β-epithiopropyl)hexane, 1-(epithioethyl)-2-(γ-epithiobutylthio)ethane, 1-(epithioethyl)-2-[2-(γ-epithiobutylthio)ethylthio]ethane, tetrakis(β-epithiopropyl)methane, 1,1,1-tris(β-epithiopropyl)propane, 1,3-bis(p-epithiopropyl)-1-(β-epithiopropyl)-2-thiapropane and 1,5-bis(β-epithiopropyl)-2,4-bis(β-epithiopropyl)-3-thiapentane;

Compounds having alicyclic backbone:
1,3- or 1,4-bis(epithioethyl)cyclohexane, 1,3- or 1,4-bis(β-epithiopropyl)cyclohexane, bis [4-(epithioethyl)cyclohexyl]methane, bis[4-(β-epithiopropyl)cyclohexyl]methane, 2,2-bis[4-(β-epithioethyl)cyclohexyl]propane, 2,2-bis[4-(β-epithiopropyl)cyclohexyl]propane, bis[4-(β-epithiopropyl)cyclohexyl] sulfide, bis[4-(epithioethyl)cyclohexyl] sulfide, 2,5-bis(epithioethyl)1,4-dithiane, 2,5-bis(β-epithiopropyl)-1,4-dithiane, 4-epithioethyl-1,2-cyclohexene sulfide, 4-epoxy-1,2-cyclohexene sulfide, 2,3-, 2,5-or 2,6-bis(1,2-epithioethyl)-1,4-diselenane, 2,3-, 2,5- or 2,6-bis(2,3-epithiopropyl)-1,4-diselenane, 2,4-, 2,5- or 2,6-bis(1,2-epithioethyl)-1,3-diselenane, 2,4-, 2,5- or 2,6-bis(2,4-epithiopropyl)-1,3-diselenane, 2,3-, 2,5-, 2,6-or 3,5-bis(1,2-epithioethyl)-1-thia-4-selenane, 2,3-, 2,5-, 2,6- or 3,5-bis(2,3-epithiopropyl)-1-thia-4-selenane, 2,4- or 4,5-bis(1,2-epithioethyl)-1,3-diselenolane, 2,4- or 4,5-bis(2,4-epithiopropyl)-1,3-diselenolane, 2,4-, 2,5- or 4,5-bis(1,2-epithioethyl)-1-thia-3-selenolane, 2,4-, 2,5- or 4,5-bis(2,4-epithiopropyl)-1-thia-3-selenolane, 2,3-, 2,4-, 2,5- or 3,4-bis(1,2-epithioethyl)selenophane, 2,3-,2,4-, 2,5- or 3,4-bis(2,3-epithiopropyl)selenophane, 2,3-, 2,5- or 2,6-bis(1,2-epithioethyl)-1,4-ditellurane, 2,3-, 2,5- or 2,6-bis(2,3-epithiopropyl)-1,4-ditellurane, 2,4-, 2,5- or 2,6-bis(1,2-epithioethyl)-1,3-ditellurane, 2,4-, 2,5- or 2,6-bis(2,4-epithiopropyl)-1,3-ditellurane, 2,3-, 2,5-, 2,6- or 3,5-bis(1,2-epithioethyl)-1-thia-4-tellurane, 2,3-, 2,5-, 2,6- or 3,5-bis(2,3-epithiopropyl)-1-thia-4-tellurane, 2,4- or 4,5-bis(1,2-epithioethyl)-1,3-ditellurolane, 2,4- or 4,5-bis(2,4-epithiopropyl)-1,3-ditellurolane, 2,4-, 2,5- or 4,5-bis(1,2-epithioethyl)-1-thia-3-tellurolane 2,4-, 2,5- or 4,5-bis(2,4-epithiopropyl)-1-thia-3-selenolane, 2,3-, 2,4-, 2,5- or 3,4-bis(1,2-epithioethyl)tellurophane, and 2,3-, 2,4-, 2,5- or 3,4-bis(2,3-epithiopropyl)tellurophane;

Compounds having aromatic backbone:
1,3- or 1,4-bis(epithioethyl)benzene, 1,3- or 1,4-bis(β-epithiopropyl)benzene, bis [4-(epithioethyl)phenyl]methane, bis[4-(β-epithiopropyl)phenyl]methane, 2,2-bis[4-(epithioethyl)phenyl]propane, 2,2-bis[4-(β-epithiopropyl)phenyl]propane, bis[4-(epithioethyl)phenyl] sulfide, bis[4-(β-epithiopropyl)phenyl] sulfide, bis[4-(epithioethyl)phenyl] sulfone, bis[4-(β-epithiopropyl)phenyl] sulfone, 4,4'-bis(epithioethyl)biphenyl, and 4,4'-bis (β-epithiopropyl)biphenyl; and Compounds obtained by replacing at least one hydrogen of the epithio group in the above compounds with methyl.

(B) Preferred examples of the compounds having in one molecule at least one structure of Formula 1 wherein Y is O include:

Organic compounds having aliphatic chain backbone:
bis(β-epithiopropyl) ether, bis(β-epithiopropyl) ether, bis(β-epithiopropyloxy)methane, 1,2-bis(β-epithiopropyloxy)ethane, 1,3-bis(β-epithiopropyloxy)propane, 1,2-bis(β-epithiopropyloxy)propane, 1-(β-epithiopropyloxy)-2-(β-epithiopropyloxymethyl)propane, 1,4-bis(β-epithiopropyloxy)butane, 1,3-bis(β-epithiopropyloxy)butane, 1-(β-epithiopropyloxy)-3-(β-epithiopropyloxymethyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, bis(epithioethyl) ether, 1-(β-epithiopropyloxy)-5-(β-epithiopropyloxymethyl)hexane, 1-(β-epithiopropyloxy)-2-[(2-β-epithiopropyloxyethyl)oxy]ethane, 1-(β-epithiopropyloxy)-2-[[2-(2-β-epithiopropyloxyethyl)oxyethyl]oxy]ethane, bis(5,6-epithio-3-oxahexyl) selenide, bis(5,6-epithio-3-oxahexyl) telluride, tetrakis(β-epithiopropyloxymethyl)methane, 1,1,1-tris(β-epithiopropyloxymethyl)propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropyloxy)-4,5-bis(β-epithiopropyloxymethyl)-3,6-dithiaoctane, 1,8-bis(β-epithiopropyloxy)-4,4-bis(β-epithiopropyloxymethyl)-3,6-dithiaoctane, 1,8-bis(β-epithiopropyloxy)-2,4,5-tris(β-epithiopropyloxymethyl)-3, 6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2-β-epithiopropyloxyethyl)oxymethyl]-3,7-dithianonane, 1,10-bis(β-epithiopropyloxy)-5,6-bis [(2-β-epithiopropyloxyethyl)oxy]-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-[(2-β-epithiopropyloxyethyl)oxymethyl]-3,6,9-trithiaundecane, and 1,11-bis(β-epithiopropyloxy)-4,7-bis(β-epithiopropyloxymethyl)-3,6,9-trithiaundecane;

Compounds having alicyclic backbone:

1,3- or 1,4-bis(β-epithiopropyloxy)cyclohexane, 1,3- or 1,4-bis(β-epithiopropyloxymethyl)cyclohexane, bis [4-(β-epithiopropyloxy)cyclohexyl]methane, 2,2-bis[4-(β-epithiopropyloxy)cyclohexyl]propane, bis[4-(β-epithiopropyloxy)cyclohexyl] sulfide, 2,5-bis(β-epithiopropyloxymethyl)-1,4-dithiane, 2,5-bis(β-epithiopropyloxyethyloxymethyl)-1,4-dithiane, 2,4- or 4,5-bis(3,4-epithio-1-oxabutyl)-1,3-diselenolane, 2,4- or 4,5-bis(4,5-epithio-2-oxapentyl)-1,3-diselenolane, 2,4-, 2,5- or 4,5-bis(3,4-epithio-1-oxabutyl)-1-thia-3-selenolane, 2,4-, 2,5- or 4,5-bis(4,5-epithio-2-oxapentyl)-1-thia-3-selenolane, bis(3,4-epithio-1-oxabutyl)tricycloselenaoctane, bis(3,4-epithio-1-oxabutyl)dicycloselenanonane, 2,3-, 2,4-, 2,5- or 3,4-bis(3,4-epithio-1-oxabutyl)selenophane, 2,3-, 2,4-, 2,5- or 3,4-bis(4,5-epithio-2-oxapentyl)selenophane, 2,3-, 2,5- or 2,6-bis(3,4-epithio-1-oxabutyl)-1,4-diselenane, 2,3-, 2,5- or 2,6-bis(4,5-epithio-2-oxapenyyl)-1,4-diselenane, 2,4-,2,5- or 2,6-bis(3,4-epithio-1-oxabutyl)-1,3-diselenane, 2,4-, 2,5- or 2,6-bis(4,5-epithio-2-oxapentyl)-1,3-diselenane, 2,3-, 2,5-, 2,6- or 3,5-bis(3,4-epithio-1-oxabutyl)-1-thia-4-selenane, 2,3-, 2,5-, 2,6- or 3,5-bis(4,5-epithio-2-oxapentyl)-1-thia-4-selenane, 2,4- or 4,5-bis(3,4-epithio-1-oxabutyl)-1,3-ditellurolane, 2,4-or 4,5-bis(4,5-epithio-2-oxapentyl)-1,3-ditellurolane, 2,4-, 2,5- or 4,5-bis(3,4-epithio-1-oxabutyl)-1-thia-3-tellurolane, 2,4-, 2,5- or 4,5-bis(4,5-epithio-2-oxapentyl)-1-thia-3-tellurolane, bis(3,4-epithio-1-oxabutyl)tricycletelluraoctane, bis(3,4-epithio-1-oxabutyl)dicycletelluranonane, 2,3-, 2,4-, 2,5- or 3,4-bis(3,4-epithio-1-oxabutyl)tellurophane, 2,3-, 2,4-, 2,5- or 3,4-bis(4,5-epitho-2-oxapentyl)tellurophane, 2,3-, 2,5- or 2,6-bis(3,4-epithio-1-oxabutyl)-1,4-ditellurane, 2,3-, 2,5- or 2,6-bis(4,5-epithio-2-oxapentyl)-1,4-ditellurane, 2,4-,2,5- or 2,6-bis(3,4-epithio-1-oxabutyl)-1,3-ditellurane, 2,4-, 2,5- or 2,6-bis(4,5-epithio-2-oxapentyl)-1,3-ditellurane, 2,3-, 2,5-, 2,6- or 3,5-bis(3,4-epithio-1-oxabutyl)-1-thia-4-tellurane, and 2,3-, 2,5-, 2,6- or 3,5-bis(4,5-epithio-2-oxapentyl)-1-thia-4-tellurane;

Compounds having aromatic backbone:

1,3- or 1,4-bis(β-epithiopropyloxy)benzene, 1,3- or 1,4-bis(β-epithiopropyloxymethyl)benzene, bis[4-(β-epithiopropyl)phenyl]methane, 2,2-bis [4-(β-epithiopropylthio)phenyl]propane, bis[4-(β-epithiopropylthio)phenyl] sulfide, bis[4-(β-epithiopropylthio)phenyl] sulfone, and 4,4'-bis(β-epithiopropylthio)biphenyl; and Compounds obtained by replacing at least one hydrogen of the epithio group in the above compounds with methyl.

(C) Preferred examples of the compounds having in one molecule at least one structure of Formula 1 wherein Y is S include:

Organic compounds having aliphatic chain backbone:

bis(β-epithiopropyl) sulfide, bis(β-epithiopropyl) sulfide, bis(β-epithiopropyl) disulfide, bis(β-epithiopropyl) disulfide, bis(β-epithiopropyl) trisulfide, bis(β-epithiopropylthio) methane, 1,2-bis(β-epithiopropylthio)ethane, 1,3-bis(β-epithiopropylthio)propane, 1,2-bis(β-epithiopropylthio) propane, bis(epithioethyl) sulfide, bis(epithioethyl) disulfide, 1-(β-epithiopropylthio)-2-(β-epithiopropylthiomethyl)propane, 1,4-bis(β-epithiopropylthio)butane, 1,3-bis (β-epithiopropylthio)butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[[2-(2-β-epithiopropylthioethyl)thioethyl]thio]ethane, tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis [(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane, 1,11-bis(β-epithiopropylthio)-4,7-bis(β-epithiopropylthiomethyl)-3,6,9-trithiaundecane, tetra[2-(β-epithiopropylthio)acetylmethyl]methane, 1,1,1-tri[2-(β-epithiopropylthio)acetylmethyl]propane, tetra[2-(β-epithiopropylthiomethyl)acetylmethyl]methane, 1,1,1-tri[2-(β-epithiopropylthiomethyl)acetylmethyl]propane, bis(5,6-epithio-3-thiahexyl) selenide, 2,3-bis(6,7-thioepoxy-1-selena-4-thiaheptyl)-1-(3,4-thioepoxy-1-thiabutyl)propane, 1,1,3,3-tetrakis(4,5-thioepoxy-2-thiapentyl)-2-selenapropane, bis(4,5-thioepoxy-2-thiapentyl)-3,6,9-triselenaundecane-1,11-bis(3,4-thioepoxy-1-thiabutyl), 1,4-bis(3,4-thioepoxy-1-thiabutyl)-2,3-bis(6,7-thioepoxy-1-selena-4-thiaheptyl)butane, tris(4,5-thioepoxy-2-thiapentyl)-3-selena-6-thiaoctane-1,8-bis(3,4-thioepoxy-1-thiabutyl), bis(5,6-epithio-3-thiahexyl) telluride, 2,3-bis(6,7-thioepoxy-1-tellura-4-thiaheptyl)-1-(3,4-thioepoxy-1-thiabutyl)propane, 1,1,3,3-tetrakis(4,5-thioepoxy-2-thiapentyl)-2-tellurapropane, bis(4,5-thioepoxy-2-thiapentyl)-3,6,9-tritelleraundecane-1,11-bis(3,4-thioepoxy-1-thiabutyl), 1,4-bis(3,4-thioepoxy-1-thiabutyl)-2,3-bis(6,7-thioepoxy-1-tellura-4-thiaheptyl)butane and tris(4,5-thioepoxy-2-thiapentyl)-3-tellura-6-thiaoctane-1,8-bis(3,4-thioepoxy-1-thiabutyl);

Compounds having alicyclic backbone:

1,3- or 1,4-bis(β-epithiopropylthio)cyclohexane, 1,3- or 1,4-bis(β-epithiopropylthiomethyl)cyclohexane, bis[4-(β-epithiopropylthio)cyclohexyl]methane, 2,2-bis [4-(β-epithiopropylthio)cyclohexyl]propane, bis[4-(β-epithiopropylthio)cyclohexyl] sulfide, 2,5-bis(β-epithiopropylthiomethyl)-1,4-dithiane, 2,5-bis(β- epithiopropylthioethylthiomethyl)-1,4-dithiane, 2,3-, 2,5- or 2,6-bis(3,4-epithio-1-thiabutyl)-1,4-diselenane, 2,3-, 2,5- or 2,6-bis(4,5-epithio-2-thiapentyl)-1,4-diselenane, 2,4-, 2,5- or 5,6-bis(3,4-epithio-1-thiabutyl)-1,3-diselenane, 2,4-, 2,5- or 5,6-bis(4,5-epithio-2-thiapentyl)-1,3-diselenane, 2,3-, 2,5-, 2,6- or 3,5-bis(3,4-epithio-1-thiabutyl)-1-thia-4-selenane, 2,3-, 2,5-, 2,6- or 3,5-bis(4,5-epithio-2-thiapentyl)-1-thia-4-selenane, 2,4- or 4,5-bis(3,4-epithio-1-thiabutyl)-1,3-diselenolane, 2,4- or 4,5-bis(4,5-epithio-2-thiapentyl)-1,3-diselenolane, 2,4-, 2,5-or 4,5-bis(3,4-epithio-1-thiabutyl)-1-thia-3-selenolane, 2,4-, 2,5- or 4,5-bis(4,5-epithio-2-thiapentyl)-1-thia-3-selenolane, 2,6-bis(4,5-epithio-2-thiapentyl)-1,3,5-triselenane, bis(3,4-epithio-1-thiabutyl) tricycloselenaoctane, bis(3,4-epithio-1-thiabutyl) dicycloselenanonane, 2,3-, 2,4-, 2,5- or 3,4-bis(3,4-epithio-1-thiabutyl)selenophane, 2,3-, 2,4-, 2,5- or 3,4-bis(4,5-epithio-2-thiapentyl)selenophane, 2-(4,5-thioepoxy-2-thiapentyl)-5-(3,4-thioepoxy-1-thiabutyl)-1-selenacyclohexane, 2,3-, 2,4-, 2,5-, 2,6-, 3,4-, 3,5- or 4,5-bis(3,4-thioepoxy-1-thiabutyl)-1-selenacyclohexane, 2,3-, 2,4-, 2,5-, 2,6-, 3,4-, 3,5- or 4,5-bis(4,5-thioepoxy-2-thiapentyl)-1-selenacyclohexane, 2,3-, 2,5- or 2,6-bis(3,4-epithio-1-thiabutyl)-1,4-ditellurane, 2,3-, 2,5- or 2,6-bis(4,5-epithio-2-thiapentyl)-1,4-ditellurane, 2,4-, 2,5- or 5,6-bis(3, 4-epithio-1-thiabutyl)-1,3-ditellurane, 2,4-, 2,5- or 5,6-bis(4, 5-epithio-2-thiapentyl)-1,3-ditellurane, 2,3-,2,5-, 2,6- or 3,5-bis(3,4-epithio-1-thiabutyl)-1-thia-4-tellurane, 2,3-, 2,5-, 2,6-3,5-bis(4,5-epithio-2-thiapentyl)-1-thia-4-tellurane, 2,4- or 4,5-bis(3,4-epithio-1-thiabutyl)-1,3-ditellurolane, 2,4- or 4,5-bis(4,5-epithio-2-thiapentyl)-1,3-ditellurolane, 2,4-, 2,5- or 4,5-bis(3,4-epithio-1-thiabutyl)-1-thia-3-tellurolane, 2,4-, 2,5- or 4,5-bis(4,5-epithio-2-thiapentyl)-1-thia-3-tellurolane, 2,6-bis(4,5-epithio-2-thiapentyl)-1,3,5-tritellurane, bis(3,4-epithio-1-thiabutyl) tricycletelluraoctane, bis(3,4-epithio-1-thiabutyl) dicyclotelluranonane, 2,3-, 2,4-, 2,5- or 3,4-bis(3,4-epithio-1-thiabutyl)tellurophane, 2,3-, 2,4-, 2,5- or 3,4-bis(4,5-epithio-2-thiapentyl)tellurophane, 2-(4,5-thioepoxy-2-thiapentyl)-5-(3,4-thioepoxy-1-thiabutyl)-1-telluracyclohexane, 2,3-, 2,4-, 2,5-, 2,6-, 3,4-, 3,5- or 4,5- bis(3,4-thioepoxy-1-thiabutyl)-1-telluracyclohexane, and 2,3-, 2,4-, 2,5-, 2,6-, 3,4-, 3,5-or 4,5-bis(4,5-thioepoxy-2-thiapentyl)-1-telluracyclohexane;

Compounds having aromatic backbone:
1,3- or 1,4-bis(β-epithiopropylthio)benzene, 1,3- or 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl] sulfide, bis[4-(β-epithiopropylthio)phenyl] sulfone, and 4,4'-bis(β-epithiopropylthio)biphenyl; and Compounds obtained by replacing at least one hydrogen of the β-epithiopropyl group in the above compounds with methyl.

(D) Preferred examples of the compounds having in one molecule at least one structure of Formula 1 wherein Y is Se include:

Organic compounds having aliphatic chain backbone:
bis(β-epithiopropyl) selenide, bis(β-epithiopropyl) selenide, bis(β-epithiopropyl) diselenide, bis(β-epithiopropyl) diselenide, bis(β-epithiopropyl) triselenide, bis(β-epithiopropylseleno)methane, 1,2-bis(β-epithiopropylseleno) ethane, 1,3-bis(β-epithiopropylseleno)propane, 1,2-bis(β-epithiopropylseleno)propane, bis(epithioethyl) selenide, bis (epithioethyl) diselenide, 1-(β-epithiopropylseleno)-2-(β-epithiopropylselenomethyl)propane, 1,4-bis(β-epithiopropylseleno)butane, 1,3-bis(β-epithiopropylseleno) butane, 1-(β-epithiopropylseleno)-3-(β-epithiopropylselenomethyl)butane, 1,5-bis(β-epithiopropylseleno) pentane, 1-(β-epithiopropylseleno)-4-(β-epithiopropylselenomethyl)pentane, 1,6-bis(β-epithiopropylseleno)hexane, 1-(β-epithiopropylseleno)-5-(β-epithiopropylselenomethyl)hexane, 1-(β-epithiopropylseleno)-2-[(2-β-epithiopropylselenoethyl)thio] ethane, 1-(β-epithiopropylseleno)-2-[[2-(2-β-epithiopropylselenoethyl)selenoethyl]thio]ethane, tetrakis (β-epithiopropylselenomethyl)methane, 1,1,1-tris(β-epithiopropylselenomethyl)propane, 1,5-bis(β-epithiopropylseleno)-2-(β-epithiopropylselenomethyl)-3-thiapentane, 1,5-bis(β-epithiopropylseleno)-2,4-bis(β-epithiopropylselenomethyl)-3-thiapentane, 1-(β-epithiopropylseleno)-2,2-bis(β-epithiopropylselenomethyl)-4-thiahexane, 1,5,6-tris(β-epithiopropylseleno)-4-(,-epithiopropylselenomethyl)-3-thiahexane, 1,8-bis(β-epithiopropylseleno)-4-(β-epithiopropylselenomethyl)-3,6-dithiaoctane, 1,8-bis(β-epithiopropylseleno)-4,5-bis(β-epithiopropylselenomethyl)-3,6-dithiaoctane, 1,8-bis(β-epithiopropylseleno)-4,4-bis(β-epithiopropylselenomethyl)-3,6-dithiaoctane, 1,8-bis(β-epithiopropylseleno)-2,4,5-tris (β-epithiopropylselenomethyl)-3,6-dithiaoctane, 1,8-bis(β-epithiopropylseleno)-2,5-bis(β-epithiopropylselenomethyl)-3,6-dithiaoctane, 1,9-bis(β-epithiopropylseleno)-5-(β-epithiopropylselenomethyl)-5-[(2-β-epithiopropylselenoethyl)selenomethyl]-3,7-dithianonane, 1,10-bis(β-epithiopropylseleno)-5,6-bis[(2-β-epithiopropylselenoethyl)thio]-3,6,9-trithiadecane 1,11-bis(β-epithiopropylseleno)-4,8-bis(β-epithiopropylselenomethyl)-3,6, 9-trithiaundecane, 1,11-bis(β-epithiopropylseleno)-5,7-bis (β-epithiopropylselenomethyl)-3,6,9-trithiaundecane, 1,11-bis(β-epithiopropylseleno)-5,7-[(2-β-epithiopropylselenoethyl)selenomethyl]-3,6,9-trithiaundecane, 1,11-bis(β-epithiopropylseleno)-4,7-bis(β-epithiopropylselenomethyl)-3,6,9-trithiaundecane, tetra[2-(β-epithiopropylseleno)acetylmethyl]methane, 1,1,1-tri[2-(β-epithiopropylseleno)acetylmethyl]propane, tetra[2-(β-epithiopropylselenomethyl)acetylmethyl]methane, 1,1,1-tri [2-(β-epithiopropylselenomethyl)acetylmethyl]propane, bis (5,6-epithio-3-selenohexyl) selenide, 2,3-bis(6,7-thioepoxy-1-selena-4-selenoheptyl)-1-(3,4-thioepoxy-1-selenobutyl) propane, 1,1,3,3-tetrakis(4,5-thioepoxy-2-selenopentyl)-2-selenapropane, bis(4,5-thioepoxy-2-selenopentyl)-3,6,9-triselenaundecane-1,11-bis(3,4-thioepoxy-1-selenobutyl), 1,4-bis(3,4-thioepoxy-1-selenobutyl)-2,3-bis(6,7-thioepoxy-1-selena-4-selenoheptyl)butane, tris(4,5-thioepoxy-2-selenopentyl)-3-selena-6-thiaoctane-1,8-bis(3,4-thioepoxy-1-selenobutyl), bis(5,6-epithio-3-selenohexyl) telluride, 2,3-bis(6,7-thioepoxy-1-tellura-4-selenoheptyl)-1-(3,4-thioepoxy-1-selenobutyl)propane, 1,1,3,3-tetrakis(4,5-thioepoxy-2-selenopentyl)-2-tellurapropane, bis(4,5-thioepoxy-2-selenopentyl)-3,6,9-tritelluraundecane-1,11-bis (3,4-thioepoxy-1-selenobutyl), 1,4-bis(3,4-thioepoxy-1-selenobutyl)-2,3-bis(6,7-thioepoxy-1-tellura-4-selenoheptyl)butane and tris(4,5-thiepoxy-2-selenopentyl)-3-tellura-6-thiaoctane-1,8-bis(3,4-thioepoxy-1-selenobutyl);

Compounds having alicyclic backbone:
1,3- or 1,4-bis(β-epithiopropylseleno)cyclohexane, 1,3- or 1,4-bis(β-epithiopropylselenomethyl)cyclohexane, bis[4-(β-epithiopropylseleno)cyclohexyl]methane, 2,2-bis [4-(β-epithiopropylseleno)cyclohexyl]propane, bis[4-(β-epithiopropylseleno)cyclohexyl] sulfide, 2,5-bis(β-epithiopropylselenomethyl)-1,4-dithiane, 2,5-bis(β- epithiopropylselenoethylthiomethyl)-1,4-dithiane, 2,3-2,5- or 2,6-bis(3,4-epithio-1-selenobutyl)-1,4-diselenane, 2,3-, 2,5- or 2,6-bis(4,5-epithio-2-selenopentyl)-1,4-diselenane, 2,4-, 2,5- or 5,6-bis(3,4-epithio-1-selenobutyl)-1,3-diselenane, 2,4-, 2,5- or 5,6-bis(4,5-epithio-2-selenopentyl)-1,3-diselenane, 2,3-, 2,5-, 2,6- or 3,5-bis(3,4-epithio-1-selenobutyl)-1-thia-4-selenane, 2,3-, 2,5-, 2,6- or 3,5-bis(4,5-epithio-2-selenopentyl)-1-thia-4-selenane, 2,4- or 4,5-bis(3,4-epithio-1-selenobutyl)-1,3-diselenolane, 2,4- or 4,5-bis(4,5-epithio-2-selenopentyl)-1,3-diselenolane, 2,4-, 2,5- or 4,5-bis(3,4-epithio-1-selenobutyl)-1-thia-3-selenolane, 2,4-, 2,5- or 4,5-bis(4,5-epithio-2-selenopentyl)-1-thia-3-selenolane, 2,6-bis(4,5-epithio-2-selenopentyl)-1,3,5-triselenane, bis(3,4-epitbio-1-selenobutyl)tricycloselenaoctane, bis(3,4-epithio-1-selenobutyl)dicycloselenanonane, 2,3-, 2,4-, 2,5- or 3,4-bis(3,4-epithio-1-selenobutyl)selenophane, 2,3-, 2,4-, 2,5-, 3,4-bis(4,5-epithio-2-selenopentyl)selenophane, 2-(4,5-thioepoxy-2-selenopentyl)-5-(3,4-thioepoxy-1-selenobutyl)-1-selenacyclohexane, 2,3-, 2,4-, 2,5-, 2,6-, 3,4-, 3,5- or 4,5-bis(3,4-thioepoxy-1-selenobutyl)-1-selenacyclohexane, 2,3-, 2,4-, 2,5-, 2,6-, 3,4-, 3,5- or 4,5-bis(4,5-thioepoxy-2-selenopentyl)-1-selenacyclohexane, 2,3-, 2,5- or 2,6bis(3,4-epithio-1-selenobutyl)-1,4-ditellurane, 2,3-, 2,5- or 2,6bis(4,5-epithio-2-selenopentyl)-1,4-ditellurane, 2,4-, 2,5- or 5,6-bis(3,4-epithio-1-selenobutyl)-1,3-ditellurane, 2,4-, 2,5- or 5,6-bis(4,5-epithio-2-selenopentyl)-1,3-ditellurane, 2,3-, 2,5-, 2,6- or 3,5-bis(3,4-epithio-1-selenobutyl)-1-thia-4-tellurane, 2,3-, 2,5-, 2,6- or 3,5-bis(4,5-epithio-2-selenopentyl)-1-thia-4-tellurane, 2,4- or 4,5-bis(3,4-epithio1-selenobutyl)-1,3-ditellurolane, 2,4- or 4,5-bis(4,5-epithio-2-selenopentyl)-1,3-ditellurolane, 2,4-, 2,5- or 4,5-bis(3,4-epithio-1-selenobutyl)-1-thia-3-telluroane, 2,4-, 2,5- or 4,5-bis(4,5-epithio-2-selenopentyl)-1-thia-3-tellurolane, 2,6-bis(4,5-epithio-2-selenopentyl)-1,3,5-tritellurane, bis(3,4-epithio-1-selenobutyl)tricycloteluraoctane, bis(3,4-epithio-1-selenobutyl)dicycloteluranonane, 2,3-, 2,4-, 2,5- or 3,4-bis(3,4-epithio-1-selenobutyl)tellurophane, 2,3-, 2,4-, 2,5- or 3,4-bis(4,5-epithio-2-selenopentyl)tellurophane, 2-(4,5-thioepoxy-2-selenopentyl)-5-(3,4-thioepoxy-1-selenobutyl)-1-telluracyclohexane, 2,3-, 2,4-, 2,5-, 2,6-, 3,4-, 3,5- or 4,5-bis(3,4-thioepoxy-1-selenobutyl)-1-telluracyclohexane, and 2,3-, 2,4-, 2,5-, 2,6-, 3,4-, 3,5- or 4,5-bis(4,5-thioepoxy-2-selenopentyl)-1-telluracyclohexane;

Compounds having aromatic backbone:
1,3- or 1,4-bis(β-epithiopropylseleno)benzene, 1,3- or 1,4-bis(β-epithiopropylselenomethyl)benzene, bis[4-(β-epithiopropylseleno)phenyl]methane, 2,2-bis [4-(β-epithiopropylseleno)phenyl]propane, bis[4-(β-epithiopropylseleno)phenyl] sulfide, bis[4-(β-epithiopropylseleno)phenyl] sulfone and 4,4'-bis(β-epithiopropylseleno)biphenyl; and Compounds obtained by replacing at least one hydrogen of the β-epithiopropyl group in the above compounds with methyl.

(E) Preferred examples of the compounds having in one molecule at least one structure of Formula 1 wherein Y is Te include:

Organic compounds having aliphatic chain backbone:
bis(β-epithiopropyl) telluride, bis(β-epithiopropyl) telluride, bis(β-epithiopropyl) ditelluride, bis(β-epithiopropyl) ditelluride, bis(β-epithiopropyl) tritelluride, bis(β-epithiopropyltelluro)methane, 1,2-bis(β-epithiopropyltelluro)ethane, 1,3-bis(β-epithiopropyltelluro)propane, 1,2-bis(β-epithiopropyltelluro)propane, bis(epithioethyl) telluride, bis (epithioethyl) ditelluride, 1-(β-epithiopropyltelluro)-2-(β-epithiopropyltelluromethyl)propane, 1,4-bis(β-epithiopropyltelluro)butane, 1,3-bis(β-epithiopropyltelluro)butane, 1-(β-epithiopropyltelluro)-3-(β-epithiopropyltelluromethyl)butane, 1,5-bis(β-epithiopropyltelluro)pentane, 1-(β-epithiopropyltelluro)-4-(β-epithiopropyltelluromethyl)pentane, 1,6-bis(β-epithiopropyltelluro)hexane, 1-(β-epithiopropyltelluro)-5-(β-epithiopropyltelluromethyl)hexane, 1-(β-epithiopropyltelluro)-2-[(2-β-epithiopropyltelluroethyl)thio]ethane, 1-(β-epithiopropyltelluro)-2-[[2-(2-β-epithiopropyltelluroethyl)telluroethyl]thio]ethane, tetrakis(β-epithiopropyltelluromethyl)methane, 1,1,1-tris(β-epithiopropyltelluromethyl)propane, 1,5-bis(β-epithiopropyltelluro)-2-(β-epithiopropyltelluromethyl)-3-thiapentane, 1,5-bis(P -epithiopropyltelluro)-2,4-bis(β-epithiopropyltelluromethyl)-3-thiapentane, 1-(β-epithiopropyltelluro)-2,2-bis(β-epithiopropyltelluromethyl)-4-thiahexane, 1,5,6-tris(β-epithiopropyltelluro)-4-(β-epithiopropyltelluromethyl)-3-thiahexane, 1,8-bis(β-epithiopropyltelluro)-4-(β-epithiopropyltelluromethyl)-3,6-dithiaoctane, 1,8-bis(β-epithiopropyltelluro)-4,5-bis(β-epithiopropyltelluromethyl)-3,6-dithiaoctane, 1,8-bis(β-epithiopropyltelluro)-4,4-bis(β-epithiopropyltelluromethyl)-3,6-dithiaoctane, 1,8-bis(β-epithiopropyltelluro)-2,4,5-tris(β-epithiopropyltelluromethyl)-3,6-dithiaoctane, 1,8-bis(β-epithiopropyltelluro)-2,5-bis(β-epithiopropyltelluromethyl)-3,6-dithiaoctane, 1,9-bis(β-epithiopropyltelluro)-5-(β-epithiopropyltelluromethyl)-5-[(2-β-epithiopropyltelluroethyl)selenomethyl]-3,7-dithianonane, 1,10-bis(β-epithiopropyltelluro)-5,6-bis[(2-β-epithiopropyltelluroethyl)thio]-3,6,9-trithiadecane, 1,11-bis(β-epithiopropyltelluro)-4,8-bis(β-epithiopropyltelluromethyl)-3,6,9-trithiaundecane, 1,11-bis(β-epithiopropyltelluro)-5,7-bis(β-epithiopropyltelluromethyl)-3,6,9-trithiaundecane, 1,11-bis(β-epithiopropyltelluro)-5,7-[(2-β-epithiopropyltelluroethyl)selenomethyl]-3,6,9-trithiaundecane, 1,11-bis(β-epithiopropyltelluro)-4,7-bis(β-epithiopropyltelluromethyl)-3,6,9-trithiaundecane, tetra[2-(β-epithiopropyltelluro)acetylmethyl] methane, 1,1,1-tri[2-(β-epithiopropyltelluro)acetylmethyl]propane, tetra[2-(β-epithiopropyltelluromethyl)acetylmethyl]methane, 1,1,1-tri[2-(β-epithiopropyltelluromethyl)acetylmethyl]propane, bis (5,6-epithio-3-tellurohexyl) selenide, 2,3-bis(6,7-thioepoxy-1-selena-4-telluroheptyl)-1-(3,4-thioepoxy-1-tellurobutyl)propane, 1,1,3,3-tetrakis(4,5-thioepoxy-2-telluropentyl)-2-selenapropane, bis(4,5-thioepoxy-2-telluropentyl)-3,6,9-triselenaundecane-1,11-bis(3,4-thioepoxy-1-tellurobutyl), 1,4-bis(3,4-thioepoxy-1-tellurobutyl)-2,3-bis(6,7-thioepoxy-1-selena-4-telluroheptyl)butane, tris(4,5-thioepoxy-2-telluropentyl)-3-selena-6-thiaoctane-1,8-bis(3,4-thioepoxy-1-tellurobutyl), bis(5,6-epithio-3-tellurohexyl) telluride, 2,3-bis(6,7-thioepoxy-1-tellura-4-telluroheptyl)-1-(3,4-thioepoxy-1-tellurobutyl)propane, 1,1,3,3-tetrakis(4,5-thioepoxy-2-telluropentyl)-2-tellurapropane, bis(4,5-thioepoxy-2-telluropentyl)-3,6,9-tritelleraundecane-1,11-bis(3,4-thioepoxy-1-tellurobutyl), 1,4-bis(3,4-thioepoxy-1-tellurobutyl)-2,3-bis(6,7-thioepoxy-1-tellura-4-telluroheptyl)butane and tris(4,5-thiepoxy-2-telluropentyl)-3-tellura-6-thiaoctane-1,8-bis(3,4-thioepoxy-1-tellurobutyl);

Compounds having alicyclic backbone:
1,3- or 1,4-bis(β-epithiopropyltelluro)cyclohexane, 1,3- or 1,4-bis(β-epithiopropyltelluromethyl)cyclohexane, bis[4-(β-epithiopropyltelluro)cyclohexyl]methane, 2,2-bis[4-(β- epithiopropyltelluro)cyclohexyl]propane, bis [4-(β-epithiopropyltelluro)cyclohexyl] sulfide, 2,5-bis(β-epithiopropyltelluromethyl)-1,4-dithiane, 2,5-bis(β-epithiopropyltelluroethylthiomethyl)-1,4-dithiane, 2,3-, 2,5- or 2,6-bis(3,4-epithio-1-tellurobutyl)-1,4-diselenane, 2,3-, 2,5- or 2,6-bis(4,5-epithio-2-telluropentyl)-1,4-diselenane, 2,4-, 2,5- or 5,6-bis(3,4-epithio-1-tellurobutyl)-1,3-diselenane, 2,4-, 2,5- or 5,6-bis(4,5-epithio-2-telluropentyl)-1,3-diselenane, 2,3-, 2,5-, 2,6- or 3,5-bis(3,4-epithio-1-tellurobutyl)-1-thia-4-selenane, 2,3-, 2,5-, 2,6- or 3,5-bis(4,5-epithio-2-telluropentyl)-1-thia-4-selenolane, 2,4- or 4,5-bis(3,4-epithio-1-tellurobutyl)-1,3-diselenolane, 2,4- or 4,5-bis(4,5-epithio-2-telluropentyl)-1,3-diselenolane, 2,4-, 2,5- or 4,5-bis(3,4-epithio-1-tellurobutyl)-1-thia-3-selenoolane, 2,4-, 2,5- or 4,5-bis(4,5-epithio-2-telluropentyl)-1-thia-3-selenolane, 2,6-bis(4,5-epithio-2-telluropentyl)-1,3,5-triselenane, bis(3,4-epithio-1-tellurobutyl)tricycloselenaoctane, bis(3,4-epithio-1-tellurobutyl)dicycloselenanonane, 2,3-, 2,4-, 2,5- or 3,4-bis(3,4-epithio-1-tellurobutyl)selenophane, 2,3-, 2,4-, 2,5- or 3,4-bis(4,5-epithio-2-telluropentyl)selenophane, 2-(4,5-thioepoxy-2-telluropentyl)-5-(3,4-thioepoxy-1-tellurobutyl)-1-selenacyclohexane, 2,3-, 2,4-, 2,5-, 2,6-, 3,4-, 3,5- or 4,5-bis(3,4-thioepoxy-1-tellurobutyl)-1-selenacyclohexane, 2,3-, 2,4-, 2,5-, 2,6-, 3,4-, 3,5- or 4,5-bis(4,5-thioepoxy-2-telluropentyl)-1-selenacyclohexane, 2,3-, 2,5- or 2,6-bis(3,4-epithio-1-tellurobutyl)-1,4-ditellurane, 2,3-, 2,5- or 2,6-bis(4,5-epithio-2-telluropentyl)-1,4-ditellurane, 2,4-, 2,5- or 5,6-bis(3,4-epithio-1-tellurobutyl)-1,3-ditellurane, 2,4-, 2,5- or 5,6-bis(4,5-epithio-2-telluropentyl)-1,3-ditellurane, 2,3-, 2,5-, 2,6- or 3,5-bis(3,4-epithio-1-tellurobutyl)-1-thia-4-tellurane, 2,3-, 2,5-, 2,6- or 3,5-bis(4,5-epithio-2-telluropentyl)-1-thia-4-tellurane, 2,4- or 4,5-bis(3,4-epithio-1-tellurobutyl)-1,3-ditellurolane, 2,4- or 4,5-bis(4,5-epithio-2-telluropentyl)-1,3-ditellurolane, 2,4-, 2,5- or 4,5-bis(3,4-epithio-1-tellurobutyl)-1-thia-3-tellurolane, 2,4-, 2,5- or 4,5-bis(4,5-epithio-2-telluropentyl)-1-thia-3-tellurolane, 2,6-bis(4,5-epithio-2-telluropentyl)-1,3,5-tritellurane, bis(3,4-epithio-1-tellurobutyl) tricyclotelluraoctane, bis(3,4-epithio-1-tellurobutyl) dicyclotelluranonane, 2,3-, 2,4-, 2,5- or 3,4-bis(3,4-epithio-1-tellurobutyl)tellurophane, 2,3-, 2,4-, 2,5- or 3,4-bis(4,5-epithio-2-telluropentyl)tellurophane, 2-(4,5-thioepoxy-2-telluropentyl)-5-(3,4-thioepoxy-1-tellurobutyl)-1-telluracyclohexane, 2,3-, 2,4-, 2,5-, 2,6-, 3,4-, 3,5- or 4,5-bis(3,4-thioepoxy-1-tellurobutyl)-1-telluracyclohexane, and 2,3-, 2,4-, 2,5-, 2,6-, 3,4-, 3,5- or 4,5-bis(4,5-thioepoxy-2-telluropentyl)-1-telluracyclohexane;

Compounds having aromatic backbone:

1,3- or 1,4-bis(β-epithiopropyltelluro)benzene, 1,3- or 1,4-bis(β-epithiopropyltelluromethyl)benzene, bis[4-(β-epithiopropyltelluro)phenyl] methane, 2,2-bis [4-(β-epithiopropyltelluro)phenyl]propane, bis [4-(β-epithiopropyltelluro) phenyl] sulfide, bis[4-(β-epithiopropyltelluro)phenyl] sulfone, and 4,4'-bis(β-epithiopropyltelluro)biphenyl; and Compounds obtained by replacing at least one hydrogen of the β-epithiopropyl group in the above compounds with methyl.

The compounds (A) to (E) may include those having an unsaturated group. Examples thereof include vinylphenyl thioglycidyl ether, vinylbenzyl thioglycidyl ether, thioglycidyl methacrylate, thioglycidyl acrylate and allyl thioglycidyl ether.

The compound (a) is not limited to those mentioned above and may be used alone or in combination of two or more.

Of the above compounds, preferred are the compounds (B) having in one molecule at least one structure of Formula 1 wherein Y is O, the compounds (C) having in one molecule at least one structure of Formula 1 wherein Y is S, the compounds (D) having in one molecule at least one structure of Formula 1 wherein Y is Se. More preferred are the compounds (C) and (D). Still more preferred are the compounds (C) and (D) wherein m is 1 or 2, and n is 1 or 2, and the most preferred are the compounds (C) and (D) wherein m is 1 and n is 1 or 2.

Examples of the most preferred compounds include bis (β-epithiopropyl) sulfide, bis(β-epithiopropyl) disulfide, bis (β-epithiopropyl) selenide, bis(β-epithiopropyl) diselenide, and compounds having two or more β-epithiopropylthio groups or β-epithiopropylseleno groups together with the chain backbone, the branched backbone, the alicyclic backbone, the aromatic backbone or the heterocyclic backbone mentioned above. Especially preferred of the above are chain or branched compounds having two or more β-epithiopropylthio groups or β-epithiopropylseleno groups, bis (β-epithiopropyl) sulfide, bis(β-epithiopropyl) disulfide, bis (β-epithiopropyl) selenide, and bis(β-epithiopropyl) diselenide.

The compound (b) includes any compounds having in one molecule at least one isocyanate group and/or isothiocyanate group. Examples thereof include isocyanate compounds such as methyl isocyanate, ethyl isocyanate, propyl isocyanate, isopropyl isocyanate, n-butyl isocyanate, sec-butyl isocyanate, tert-butyl isocyanate, pentyl isocyanate, hexyl isocyanate, octyl isocyanate, dodecyl isocyanate, cyclohexyl isocyanate, phenyl isocyanate, tolyl isocyanate, diethylene diisocyanate, tetramethylene diisocyanate, hexamethylene diisocyanate, trimethylhexamethylene diisocyanate, cyclohexane diisocyanate, 1,3-bis(isocyanatomethyl)cyclohexane, 1,4-bis(isocyanatomethyl)cyclohexane, isophorone diisocyanate, 2,6-bis(isocyanatomethyl)decahydronaphthalene, lysine triisocyanate, 2,4-tolylene diisocyanate, 2,6-tolylene diisocyanate, o-tolydyne diisocyanate, 4,4'-diphneylmethane diisocyanate, diphenyl ether diisocyanate, 3-(2'-isocyanatocyclohexyl)propyl isocyanate, tris(phenylisocyanate) thiophosphate, isopropylidene bis(cyclohexylisocyanate), 2,2'-bis(4-isoisocyanatophenyl)propane, triphenylmethane triisocyanate, bis(diisocyanatotolyl) phenylmethane, 4,4',4"-triisocyanato-2,5-dimethoxyphenylamine, 3,3'-dimethoxybenzidine-4,4'-diisocyanate, 1,3-phenylene diisocyanate, 1,4-phenylene diisocyanate, 4,4'-diisocyanatobiphenyl, 4,4'-diisocyanato-3,3'-dimethylbiphenyl, dicyclohexylmethan-4,4'-diisocyanate, 1,1'-methylenebis(4-isocyanatobenzene), 1,1'-methylenebis(3-methyl-4-isocyanatobenzene), m-xylylene diisocyanate, β-xylylene diisocyanate, 1,3-bis(1-isocyanato-1-methylethyl)benzene, 1,4-bis(1-isocyanato-1-methylethyl)benzene, 1,3-bis(2-isocyanato-2-propyl)benzene, 2,6-bis(isocyanatomethyl)naphthalene, 1,5-naphthalene diisocyanate, bis(isocyanatomethyl)tetrahydrodicyclopentadiene, bis(isocyanatomethyl)dicyclopentadiene, bis(isocyanatomethyl)tetrahydrothiophene, 2,5-diisocyanatomethylnorbornene, bis(isocyanatomethyl)adamantane, dimeric acid diisocyanate, 1,3,5-tri(1-isoisocyanatohexyl)isocyanuric acid, thiodiethyl diusocyanate, thiodipropyl diisocyanate, thiodihexyl diisocyanate, bis[(4-isocyanatomethyl)phenyl] sulfide, 2,5-diisocyanato-1,4-dithiane, 2,5-diisocyanatomethyl-1,4-dithiane, 2,5-diisocyanatomethyl thiophene, dithiodiethyl diisocyanate, and dithiodipropyl diisocyanate; and compounds derived from the above isocyanate compounds by replacing all or a part of the isocyanate group thereof with isothiocyanate group. The polyisocyanate compounds mentioned above includes dimers produced by biuret reaction, cyclic trimers, alcohol adducts and thiol adducts.

The compound (b) is not limited to those mentioned above and may be used alone or in combination of two or more. Preferred compounds (b) are those having in one molecule two or more isocyanate groups and/or isothiocyanate groups.

The compound (c) includes any compounds having in one molecule at least one mercapto group. Examples thereof include mercaptans such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, phenyl mercaptan, benzyl mercaptan, 3-methylphenyl mercaptan, 4-methylphenyl mercaptan, 4-chlorobenzyl mercaptan, 4-vinylbenzyl mercaptan, 3-binylbenzyl mercaptan, methyl mercaptopropionate, ethyl thioglycolate, n-butyl thioglycolate, n-octyl thioglycolate, methyl 3-mercaptopropionate, ethyl 3-mercaptopropionate, 3-methoxybutyl 3-mercaptopropionate, n-butyl 3-mercaptopropionate, 2-ethylhexyl 3-mercaptopropionate, n-octyl 3-mercaptopropionate, 2-mercaptoethanol, 3-mercapto-1,2-propanediol, 2-mercapto-1,3-propanediol, mercaptoacetic acid, mercaptoglycolic acid, mercaptopropionic acid, methanedithiol, methanetrithiol, 3-mercaptopropanol, 2-mercaptopropanol, 2-phenyl-2-mercaptoethanol, 1,2-dimercaptoethane, 1,2-dimercaptopropane, 1,3-dimercaptopropane, 2,2-dimercaptopropane, 1,4-dimercaptobutane, 1,6-dimercaptohexane, bis(2-mercaptoethyl) ether, bis(2-mercaptoethyl) sulfide, 1,2-bis(2-mercaptoethyloxy)ethane, 1,2-bis(2-mercaptoethylthio)ethane, 2,3-dimecrapto-1-propanol, 1,3-dimercapto-2-propanol, 1,2,3-trimercaptopropane, 2-mercaptomethyl-1,3-dimercaptopropane, 2-mercaptomethyl-1,4-dimercaptobutane, 2-(2-mercaptoethylthio)-1,3-dimercaptopropane, 4-mercaptomethyl-1,8-dimercapto-3,6-dithiaoctane, 2,4-dimercaptomethyl-1,5-dimercapto-3-thiapentane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1-tris(mercaptomethyl)propane, tetrakis(mercaptomethyl)methane, ethylene glycol bis(2-mercaptoacetate), ethylene glycol bis(3-mercaptopropionate), diethylene glycol bis(2-mercaptoacetate), diethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-bis(mercaptomethyl)-1,4-dithiane, 2,5-bis(2-mercaptoethyl)-1,4-dithiane, 2,5-bis(2-mercaptoethylthiomethyl)-1,4-dithiane, 2,5-bis(mercaptomethyl)-1-thiane, 2,5-bis(2-mercaptoethyl)-1-thiane, 2,5-bis(mercaptomethyl)thiophene, thiophenol, 4-tert-butylthiophenol, 2-methylthiophenol, 3-methylthiophenol, 4-methylthiophenol, 2-vinylthiophenol, 3-vinylthiophenol, 4-vinylthiophenol, 2-hydroxythiophenol, 3-hydroxythiophenol, 4-hydroxythiophenol, 1,2-dimercaptobenzene, 1,3-dimercaptobenzene, 1,4-dimercaptobenzene, 1,3-bis(mercaptomethyl)benzene, 1,4-bis(mercaptomethyl)benzene, 2,2'-dimercaptobiphenyl, 4,4'-dimercaptobiphenyl, bis(4-mercaptophenyl)methane, 2,2-bis(4-mercaptophenyl)propane, bis(4-mercaptophenyl) ether, bis(4-mercaptophenyl) sulfide, bis(4-mercaptophenyl) sulfone, bis(4-mercaptomethylphenyl)methane, 2,2-bis(4-mercaptomethylphenyl)propane, bis(4-mercaptomethylphenyl) ether, bis(4-mercaptomethylphenyl) sulfide, mercaptobenzoic acid, 2-mercaptoimidazole, 2-mercapto-1-methylimidazole, 2,5-dimercapto-1,3,4-thiadiazole, 3,4-thiophenedithiol, glyceryl dithioglycolate, 2-selenoethanol, bis(2-mercaptoethyl) selenide, bis(1,3-dimercapto-2-propyl) selenide, 2,3-bis(mercaptoethylseleno)-1-propanethiol, 2-mercaptomethyl-1,5-dimercapto-3-selenapentane, 4,8-bis(mercaptomethyl)-1,11-dimercapto-3,9-dithia-6-selenaundecane, 4,8-bis(mercaptomethyl)-1,11-dimercapto-6-thia-3,9-diselenaundecane, 4,8-bis(mercaptomethyl)-1,11-dimercapto-3,6,9-triselenaundecane, bis(hydroxymercaptoethylselenomethyl)benzene, 1,4-dimercapto-2,3-bis(mercaptoethylseleno)butane, 1,2,3,4-tetrakis(mercaptoethylseleno)butane, 1,9-dimercapto-5,5-bis(mercaptomethyl)-3,7-diselenanonane, tris(mercaptomethyl)-1,8-dimercapto-6-thia-3-selenaoctane, bis(mercaptoethylselenomethyl)benzene, 2,5-diseleno-1,4-dithiane, 2,5-bis(selenomethyl)-1,4-dithiane, 2,5-bis(mercaptoethylselenomethyl)-1,4-dithiane, 2,6-dimercapto-1-selena-4-thiane, 3,5-dimercapto-1-selena-4-thiane, 2,6-bis(mercaptomethyl)-1-selena-4-thiane, 3,5-bis(mercaptomethyl)-1-selena-4-thiane, 2,5-dimercapto-1,4-diselenane, 2,6-dimercapto-1,4-diselenane, 2,5-bis(mercaptomethyl)-1,4-diselenane, 2,6-bis(mercaptomethyl)-1,4-diselenane, 2,5-dimercaptoselenane, 3,4-dimercaptoselenane, 2,5-bis(mercaptomethyl)selenane, 3,4-bis(mercaptomethyl)selenane, 2,5-bis(selenomethyl)selenane, 3,4-bis(selenomethyl)selenane, 4,5-dimercapto-1,3-diselenorane, 4,5-bis(dimercapto)-1,3-diselenorane, 3,6-dimercaptotriselenocyclooctane, 3,6-bis(mercaptomethyl)triselenocyclooctane, 3,6-diselenotriselenocyclooctane, and 3,6-bis(selenomethyl)triselenocyloocatane. The polymercaptans mentioned above include oligomers of about 2 to 20 polymerization degree.

The compound (c) is not limited to those mentioned above and may be used alone or in combination of two or more. Preferred compounds (c) are those having in one molecule two or more mercapto groups. More preferred are those having a sulfur atom in addition to the mercapto groups, and still more preferred are those having a sulfide linkage.

The compound (d) includes any inorganic compounds having at least one sulfur atom and/or selenium atom. The total amount of sulfur atom and/or selenium atom in the inorganic compound is preferably 30% by weight or more. When the amount is less than 30%, the effect of increasing the refractive index of resin is lowered because the amount of sulfur atom and/or selenium atom in the composition for optical materials increases not so much.

Examples of the inorganic compounds having sulfur atom include sulfur, hydrogen sulfide, carbon disulfide, carbon selenosulfide, ammonium sulfide, sulfur oxides such as sulfur dioxide and sulfur trioxide, salts of thiocarbonic acid, sulfuric acid, salts of sulfuric acid, salts of hydrogensulfuric acid, salts of sulfurous acid, salts of hyposulfurous acid, salts of persulfuric acid, salts of thiocyanic acid, salts of thiosulfuric acid, halides such as sulfur dichloride, thionyl chloride and thiophosgen, boron sulfide, nitrogen sulfide, silicon sulfide, phosphorus sulfide, arsenic sulfide, selenium sulfide, metal sulfides and metal hydrogensulfides. Among these compounds, sulfur, carbon disulfide, phosphorus sulfide, selenium sulfide, metal sulfides and metal hydrogensulfides are preferable, and sulfur, carbon disulfide and selenium sulfide are more preferable.

Examples of the inorganic compounds having selenium atom include, in addition to carbon selenosulfide and selenium sulfide mentioned above as the examples for the inorganic compound having sulfur atom, hydrogen selenide, selenium dioxide, carbon diselenide, ammonium selenide, oxides of selenium such as selenium dioxide, selenic acid, salts of selenic acid, selenous acid, salts of selenous acid, salts of hydrogenselenic acid, selenosulfuric acid, salts of selenosulfuric acid, selenopyrosulfuric acid, salts of selenopyrosulfuric acid, halides such as selenium tetrabromide and selenium oxychloride, salts of selenocyanic acid, boron selenide, phosphorus selenide, arsenic selenide and metal selenides. Among these compounds, selenium, carbon diselenide, phosphorus selenide and metal selenides are preferable, and selenium and carbon diselenide are more preferable. These inorganic compounds having at least one sulfur atom and/or selenium atom may be used alone or in combination of two or more.

The compound (d) is not limited to those mentioned above and may be used alone or in combination of two or more.

The composition of the present invention comprising the compound (a), compound (b), compound (c) and compound (d) is polymerized to a resin under heating in the presence or absence of a curing catalyst, preferably in the presence of a curing catalyst. As the curing catalyst, usable are amines, quaternary ammonium salts, phosphines, quaternary phosphonium salts, tertiary sulfonium salts, secondary iodonium salts, mineral acids, Lewis acids, organic acids, silicic acids, tetrafluoroboric acids, peroxides, azo compounds, condensates of aldehyde and amine compound, guanidine compounds, thiourea compounds, thiazole compounds, sulfenamide compounds, thiuram compounds, salts of dithiocarbamic acid, salts of xanthogenic acid, and acid phosphates.

Examples of the curing catalysts are mentioned below.

(1) Amines

Primary amines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, a-phenylethylamine, naphthylamine and furfurylamine; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl) ether, 1,2-bis(3-aminopropoxy)ethane, 1,3-bis(3-aminopropoxy)-2,2'-dimethylpropane, aminoethylethanolamine, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, 2- or 4-aminopiperidine, 2- or 4-aminomethylpiperidine, 2- or 4-aminoethylpiperidine, N-aminoethylpiperidine, N-aminopropylpiperidine, N-aminoethylmorpholine, N-aminopropylmorpholine, isophoronediamine, menthanediamine, 1,4-bisaminopropylpiperadine, o-, m- or p-phenylenediamine, 2,4- or 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, m- or p-xylylenediamine, 1,5- or 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8,10-tetraoxaspiro[5.5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperadine, N-aminopropylpiperadine, 1,4-bis(aminoethylpiperadine), 1,4-bis(aminopropylpiperadine), 2,6-diaminopyridine, and bis(3,4-diaminophenyl) sulfone; secondary amines such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, pyrrolidine, piperidine, 2-, 3- or 4-picoline, 2,4-, 2,6- or 3,5-lupetidine, diphenylamine, N-methylaniline, N-ethylaniline, dibenzylamine, methylbenzylamine, dinaphthylamine, pyrrol, indoline, indole, and morpholine; secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- or 2,6-dimethylpiperadine, homopiperadine, 1,1-di(4-piperidyl)methane, 1,2-di(4-piperidyl)ethane, 1,3-di(4-piperidyl)propane, and 1,4-di(4-piperidyl)butane; tertiary amines such as trimethylamine, triethylamine, tri-n-propylamine, triisopropylamine, tri(1,2-dimethylpropyl)amine, tri(3-methoxypropyl)amine, tri-n-butylamine, triisobutylamine, tri-sec-butylamine, tri-n-pentylamine, tri-3-pentylamine, tri-n-hexylamine, tri-n-octylamine, tri(2-ethylhexyl)amine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine, and 2-(2-dimethylaminoethoxy)-4-methyl-1,3,2-dioxabornane; tertiary polyamines such as tetramethylethylenediamine, pyrazine, N,N'-dimethylpiperadine, N,N'-bis(2-hydroxypropyl)piperadine, hexamethylenetetramine, N,N,N',N'-tetramethyl-1,3-butaneamine, 2-dimethylamino-2-hydroxypropane, diethylaminoethanol, N,N,N-tris(3-dimethylaminopropyl)amine, 2,4,6-tris(N,Nβ-dimethylaminomethyl)phenol, and heptamethylisobiguanide; imidazole compounds such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 2-mercaptoimidazole, 2-mercapto-N-methylimidazole, 2-mercaptobenzimidazole, 3-mercapto-4-methyl-4H-1,2,4-triazole, 5-mercapto-1-methyl-tetrazole, 2,5-dimercapto-1,3,4-thiadiazole, 1-benzyl-2-methylimidazole, N-(2'-cyanoethyl)-2-methylimidazole, N-(2'-cycanoethyl)-2-undecylimidazole, N-(2'-cyanoethyl)-2-phenylimidazole, 3,3-bis-(2-ethyl-4-methylimidazolyl)methane, and addition products of alkylimidazoles and isocyanuric acid; and amidine compounds such as 1,8-diazabicyclo [5.4.0]undecene-7,1,5-diazabicyclo[4.3.0]nonene-5, and 6-dibutylamino-1,8-diazabicyclo[5.4.0]undecene-7.

(2) Complexes of Amines (1) and Borane or Boron Trifluoride.

(3) Phosphines

Trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris(diethylamino)phosphine, tris(4-methylphenyl)phosphine, dimethylphenylphosphine, diethylphenylphosphine, dicyclohexylphenylphosphine, ethyldiphenylphosphine, diphenylcyclohexylphosphine, and chlorodiphenylphosphine.

(4) Quaternary Ammonium Salts

Tetramethylammonium chloride, tetramethylammonium bromide, tetramethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluorophosphite, tetra-n-butylammonium hydrogensulfite, tetra-n-butylammonium tetrafluoroborate, tetra-n-butylammonium tetraphenylborate, tetra-n-butylammonium β-toluenesulfonate, tetra-n-hexylammonium chloride, tetra-n-hexylammonium bromide, tetra-n-hexylammonium acetate, tetra-n-octylammonium chloride, tetra-n-octylammonium bromide, tetra-n-octylammonium acetate, trimethyl-n-octylammonium chloride, trimethyldecylammonium chloride, trimethyldodecylammonium chloride, trimethylcetylammonium chloride, trimethyllaurylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, n-butyldimethylbenzylammonium chloride, n-octyldimethylbenzylammonium chloride, decyldimethylbenzylammonium chloride, dodecyldimethylbenzylammonium chloride, cetyldimethylbenzylammonium chloride, lauryldimethylbenzylammonium chloride, methyltriphenylammonium chloride, methyltribenzylammonium chloride, methyltriphenylammonium bromide, methyltribenzylammonium bromide, ethyltriphenylammonium chloride, ethyltribenzylammonium chloride, ethyltriphenylammonium bromide, ethyltribenzylammonium bromide, n-butyltriphenylammonium chloride, n-butyltribenzylammonium chloride, n-butyltriphenylammonium bromide, n-butyltribenzylammonium bromide, 1-methylpyridinium chloride, 1-methylpyridinium bromide, 1-ethylpyridinium chloride, 1-ethylpyridinium bromide, 1-n-butylpyridinium chloride, 1-n-butylpyridinium bromide, 1-n-hexylpyridinium chloride, 1-n-hexylpyridinium bromide, 1-n-octylpyridinium bromide, 1-n-dodecylpyridinium chloride, 1-n-dodecylpyridinium bromide, 1-n-cetylpyridinium chloride, 1-n-cetylpyridinium bromide, 1-phenylpyridinium chloride, 1-phenylpyridinium bromide, 1-benzylpyridinium chloride, 1-benzylpyridinium bromide, 1-methylpicolinium chloride, 1-methylpicolinium bromide, 1-ethylpicolinium chloride, 1-ethylpicolinium bromide, 1-n-butylpicolinium chloride, 1-n-butylpicolinium bromide, 1-n-hexylpicolinium chloride, 1-n-hexylpicolinium bromide, 1-n-octylpicolinium chloride, 1-n-octylpicolinium bromide, 1-n-dodecylpicolinium chloride, 1-n-dodecylpicolinium bromide, 1-n-cetylpicolinium chloride, 1-n-cetylpicolinium bromide, 1-phenylpicolinium chloride, 1-phenylpicolinium bromide, 1-benzylpicolinium chloride, and 1-benzylpicolinium bromide.

(5) Phosphonium Salts

Tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphenylphosphonium bromide, methyltriphenylphosphonium iodide, ethyltriphenylphosphonium bromide, ethyltriphenylphosphonium iodide, n-butyltriphenylphosphonium bromide, n-butyltriphenylphosphonium iodide, n-hexyltriphenylphosphonium bromide, n-octyltriphenylphosphonium bromide, tetraphenylphosphonium bromide, tetrakishydroxymethylphosphonium chloride, tetrakishydroxymethylphosphonium bromide, tetrakishydroxyethylphosphonium chloride, and tetrakishydroxybutylphosphonium chloride.

(6) Sulfonium Salts

Trimethylsulfonium bromide, triethylsulfonium bromide, tri-n-butylsulfonium chloride, tri-n-butylsulfonium bromide, tri-n-butylsulfonium iodide, tri-n-butylsulfonium tetrafluoroborate, tri-n-hexylsulfonium bromide, tri-n-octylsulfonium bromide, triphenylsulfonium chloride, triphenylsulfonium bromide, and triphenylsulfonium iodide.

(7) Iodonium Salts

Diphenyliodonium chloride, diphenyliodonium bromide, and diphenyliodonium iodide.

(8) Mineral Acids

Hydrochloric acid, sulfuric acid, nitric acid, phosphoric acid and carbonic acid, and half esters of the mineral acids.

(9) Lewis Acid

Boron trifluoride, boron trifluoride etherate, aluminum fluoride, aluminum chloride, triphenylaluminum, potassium octanoate, calcium acetate, tetraisopropoxytitanium, tetrabutoxytitanium, tetrachlorotitanium, 2-ethylhexyl titanate, dimethyltin oxide, dimethyltin dichloride, dibutyltin diacetate, dibutyltin acetate, dibutyltin dilaurate, dibutyltin laurate, dibutyltin octanoate, dibutyltin bis(dodecylmercaptide), dibutyltin bis(isooctylthioglycolate), dibutyltin oxide, butyltin trichloride, dibutyltin dichloride, tributyltin chloride, tetrabutyltin, dioctyltin diacetate, dioctyltin acetate, dioctyltin dilaurate, dioctyltin laurate, dioctyltin diricinolate, dioctyltin dioleate, dioctyltin di(6-hydroxy)caproate, dioctyltin bis(isooctylthoglycolate), dioctyltin oxide, dioctyltin dichloride, dioctyltin maleate, dioctyltin bis(butylmaleate), didodecyltin diricinolate, tin stearate, zinc chloride, zinc acetylacetonate, copper oleate, copper acetylacetonate, iron acetylacetonato, iron naphthenate, iron lactate, iron citrate, and iron gluconate.

(10) Organic Acids and their Half Esters

(11) Silicic Acid and Tetrafluoroboric Acid

(12) Peroxides

Cumyl peroxyneodecanoate, diisopropyl peroxydicarbonate, diallyl peroxydicarbonate, di-n-propyl peroxydicarbonate, dimyristyl peroxydicarbonate, cumyl peroxyneohexanoate, tert-hexyl peroxyneodecanoate, tert-butyl peroxyneodecanoate, tert-hexyl peroxyneohexanoate, tert-butyl peroxyneohexanoate, 2,4-dichlorobenzoyl peroxide, benzoyl peroxide, dicumyl peroxide, di-tert-butyl peroxide, cumene hydroperoxide, and tert-butyl hydroperoxide.

(13) Azo Compounds 2,2'-Azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutylonitrile, 2,2'-azobis(2-methylbutylonitrile), 1,1'-azobis(cyclohexane-1-carbonitrile), 1-[(1-cyano-1-methyl)azo]formamide, 2-pneylazo-4-methoxy-2,4-dimethylvaleronitrile, 2,2'-azobis(2-methylpropane), and 2,2'-azobis(2,4,4-trimethylpentane).

(14) Condensates of Aldehyde and Amine Compound

Reaction product of acetaldehyde and ammonia, condensate of formaldehyde and β-toluidine, condensate of acetaldehyde and p-toluidine, reaction product of formaldehyde and aniline, reaction product of acetaldehyde and aniline, reaction product of butylaldehyde and aniline, reaction product of formaldehyde, acetaldehyde and aniline, reaction product of acetaldehyde, butylaldehyde and aniline, condensate of butylaldehyde and monobutylamine, reaction product of butylaldehyde and butylideneaniline, reaction product of heptaldehyde and aniline, reaction product of trichlotonylidenetetramine, condensate of α-ethyl-β-propylacrolein and aniline, and condensate of formaldehyde and alkylimidazole.

(15) Guanidine Compounds

Diphenylguanidine, phenyltolylguanidine, phenylxylylguanidine, tolylxylylguanidine, di-o-tolylguanidine, o-tolylguanide, diphenylguanidine phthalate, tetramethylguanidine, and di-o-tolylguanidine salt of dicatechol boric acid.

(16) Thiourea Compounds

Thiocarboanilide, di-o-tolylthiourea, ethylenethiourea, diethylthiourea, dibutylthiourea, dilaurylthiourea, trimethylthiourea, dimethylethylthiourea, and tetramethylthiourea.

(17) Thiazole Compounds

2-Mercaptobenzothiazole, dibenzothiazyl disulfide, cyclohexylamine salt of 2-mercaptobenzothiazole, 2-(2,4-dinitrophenylthio)benzothiazole, 2-(morpholinodithio)benzothiazole, 2-(2,6-dimethyl-4-morpholinothio)benzothiazole, N,N-diethylthiocarbamoyl-2-benzothiazolyl disulfide, 1,3-bis(2-benzothiazolylmercaptomethyl)urea, benzothiadiazylthio benzoate, 2-mercaptothiazoline, sodium salt of 2-mercaptobenzothiazole, zinc salt of 2-mercaptobenzothiazole, and complex of dibenzothiazyl disulfide and zinc chloride.

(18) Sulfenamide Compounds

N-Cyclohexyl-2-benzothiazyl sulfenamide, N-tert-butyl-2-benzothiazyl sulfenamide, N-tert-oxtyl-2-benzothiazyl sulfenamide, N-oxydiethylene-2-benzothiazyl sulfenamide, N,N-diethyl-2-benzothiazyl sulfenamide, N,N-diisopropyl-2-benzothiazyl sulfenamide, and N,N-dicyclohexyl-2-benzothiazyl sulfenamide.

(19) Thiuram Compounds

Tetramethylthiuram monosulfide, tetraethylthiuram monosulfide, tetrabutylthiuram monosulfide, dipentamethylenethiuram monosulfide, tetramethylthiuram disulfide, tetraethylthiuram disulfide, tetrabutylthiuram disulfide, N,N'-dimethyl-N,N'-diphenylthiuram disulfide, N,N'-diethyl-N,N'-diphenylthiuram disulfide, dipentamethylenethiuram disulfide, dipentamethylenethiuram tetrasulfide, and cyclic thiuram.

(20) Salts of Dithiocarbamic Acid

Sodium dimethyldithiocarbamate, sodium diethyldithiocarbamate, sodium dibutyldithiocarbamate, sodium pentamethylenedithiocarbamate, sodium cyclohexylethyldithiocarbamate, potassium dimethyldithiocarbamate, lead dimethyldithiocarbamate, zinc dimethyldithiocarbamate, zinc diethyldithiocarbamate, zinc dibutyldithiocarbamate, zinc dibenzyldithiocarbamate, zinc pentamethylenedithiocarbamate, zinc dimethylpentamethylenedithiocarbamate, zinc ethylphenyldithiocarbamate, bismuth dimethyldithiocarbamate, cadmium diethyldithiocarbamate, cadmium pentamethylenedithiocarbamate, selenium dimethyldithiocarbamate, selenium diethyldithiocarbamate, tellurium dimethyldithiocarbamate, tellurium diethyldithiocarbamate, iron dimethyldithiocarbamate, copper dimethyldithiocarbamate, diethylammonium diethyldithiocarbamate, N,N-dicyclohexylammonium dibutyldithiocarbamate, piperidinium pentamethylenedithiocarbamate, cyclohexylethylammonium sodium cyclohexylethyldithiocarbamate, pipecolinium methylpentamethylenedithiocarbamate, and complex of zinc pentamethylenedithiocarbamate and piperidine.

(21) Salts of Xanthogenic Acid

Sodium isopropylxanthate, zinc isopropylxanthate, zinc butylxanthate, and disulfide dibutylxanthate.

(22) Acid Phosphates

Mono- and/or dimethyl phosphate, mono- and/or diethyl phosphate, mono- and/or dipropyl phosphate, mono- and/or dibutyl phosphate, mono- and/or dihexyl phosphate, mono- and/or dioctyl phosphate, mono- and/or didecyl phosphate, mono- and/or didodecyl phosphate, mono- and/or diphenyl phosphate, mono- and/or dibenzyl phosphate, and mono- and/or didecanol phosphate.

The compounds recited above are examples of the polymerization catalysts for polymerization curing the composition for optical materials comprising the compounds (a), (b), (c) and (d). The catalyst is not limited thereto as far as the compound is effective for curing the composition by polymerization. These catalysts may be used alone or in combination of two or more. The addition amount of the catalyst is 0.0001 to 10.0parts by weight, preferably 0.0005 to 5.0 parts by weight based on 100 parts by weight of the composition for optical materials.

Of the above compounds, preferred because of causing little coloring of the cured product are primary monoamines, secondary monoamines, tertiary monoamines, tertiary polyamines, imidazole compounds, amidine compounds, quaternary ammonium salts, phosphines, quaternary phosphonium salts, tertiary sulfonium salts, secondary iodonium salts, and tin-containing Lewis acids. These catalysts may be used alone or in combination of two or more. Since depending on the ingredients of the composition, the mixing ratio of the ingredients and the curing method, the addition amount of the curing catalyst is not determined specifically, and usually 0.001 to 5.0 parts by weight, preferably 0.005 to 3.0 parts by weight, more preferably 0.01 to 1.0 part by weight, and most preferably 0.01 to 0.5 part by weight. If exceeding 5.0 parts by weight, the resultant cured product is colored and has a low refractive index and a poor heat resistance. If lower than 0.001 part by weight, the composition is cured insufficiently to have a poor heat resistance.

To improve the dyeability of the polymerization-cured material of the composition of the present invention, a carboxylic acid, a mercaptocarboxylic acid, a hydroxycarboxylic acid, an amide, a 1,3-diketone, a 1,3-dicarboxylic acid, a 3-ketocarboxylic acid, an ester thereof or a compound having an unsaturated group may be combinedly used. Examples thereof are described in Japanese Patent Application Laid-Open No. 11-318960. These compounds may be used alone or in combination of two or more in an amount of 0.001 to 40 parts by weight based on 100 parts by weight of the composition for optical materials.

In addition to the dyeability-improving compound mentioned above, the composition of the present invention may be cured in the presence of a compound having two or more functional groups reactive with the structure represented by Formula 1 in the compound (a); a compound having one or more such functional groups and one or more other homopolymerizable functional groups; a compound having one or more such homopolymerizable functional groups; or a compound having one homopolymerizable functional group which is also reactive with the structure represented by Formula 1. Examples of the compound having two or more functional groups reactive with the structure represented by Formula 1 in the compound (a) include epoxy compounds, known episulfide compounds and anhydrides of polybasic carboxylic acids.

Examples of the compound having one or more functional groups reactive with the structure represented by Formula 1 and one or more other homopolymerizable functional groups include epoxy compounds, episulfide compounds and carboxylic acid anhydrides each having an unsaturated group such as methacryl group, acryl group, allyl group, vinyl group and aromatic vinyl group.

Examples of the compound having one or more homopolymerizable functional groups include compounds having an unsaturated group such as methacryl group, acryl group, allyl group, vinyl group and aromatic vinyl group.

Examples of the compound having two or more functional groups reactive with the structure represented by Formula 1 are described in Japanese Patent Application Laid-Open No. 11-318960.

Examples of the compound having two or more functional groups reactive with the structure represented by Formula 1 in the compound (a) further include polyols described in Japanese Patent Application Laid-Open No. 11-166037.

The compound having two or more functional groups reactive with the structure represented by Formula 1 in the compound (a), or the compound having one or more such functional groups and one or more other homopolymerizable functional groups can be cured into a resin by the polymerization with the composition of the present invention in the presence of a curing catalyst. As the curing catalyst, the amines, the phosphines and the acids described above can be used.

If the compound having an unsaturated group is used, the polymerization is preferably conducted in the presence of a radical polymerization initiator as the polymerization accelerator. Any compound forming a radical by heating, ultraviolet light irradiation or electron beams irradiation can be used as the radical polymerization initiator. Examples thereof are described in Japanese Patent Application Laid-Open No. 11-318960. The radical polymerization initiator may be used singly or in combination of two or more.

Although the amount of the radical polymerization initiator to be used varies depending on the components of the composition and the curing process and is not strictly limited, the amount is preferably 0.01 to 5.0% by weight and more preferably 0.1 to 2.0% by weight based on the total amount of the composition.

To improve the practical properties of the optical materials being produced by polymerization-curing the composition of the present invention, the composition may be added with known additives such as antioxidants, ultraviolet light absorbents, anti-yellowing agents, bluing agents and pigments. When the composition of the present invention is easy to separate from molds during polymerization, it is effective to use or add a known external and/or internal adhesion improver, thereby controlling and improving the adhesion between the cured material being formed and the mold. On the other hand, when the composition of the present invention is difficult to release from molds after polymerization, it is effective to use or add a known external or internal mold release agent, thereby improving the releasability of the cured material being formed from the molds.

In the present invention, the composition for optical material containing the compounds (a), (b), (c) and (d) is uniformly mixed with the curing catalyst and the additives such as the adhesion or mold release improver, antioxidants, ultraviolet absorbers, bluing agents, and property improving additives. The resultant uniform mixture is cast into a mold made of glass or metal, cured by polymerization under heating, and then released from the mold to obtain the optical material.

The production of the cured resin optical material of the present invention will be described in more detail. As described above, a mixture of the main components and the optional components is cast into a mold, and cured therein to the optical material. The main components, i.e., the compounds (a), (b), (c) and (d) may be purified, if desired, by distillation, recrystallization, column purification, washing, sublimation, etc. The compounds (a), (b), (c) and (d) as the main components, and optionally, the compounds mentioned above, the curing catalyst and the additives such as adhesion or mold release improver, antioxidants, ultraviolet absorbers and bluing agents may be all or partly pre-reacted or pre-blended prior to casting into a mold in the presence or absence of a catalyst with or without stirring, and then made into a composition to be cast into a mold. The components may be reacted or blended by adding each component stepwise. Alternatively, a few of the components are reacted or blended in separate containers and then blended together in a single container. The order of the reaction or blend is not particularly limited.

The pre-blending or pre-reaction referred to herein includes a method in which the compound (a) and the compound (b) are pre-blended or pre-reacted, and thereafter, the compound (c) and the compound (d) are separately added or added after blending or reaction; a method in which the compound (b) and the compound (c) are pre-blended or pre-reacted, and thereafter, the compound (a) and the compound (d) are separately added or added after blending or reaction; a method in which the compound (a) and the compound (c) are pre-blended or pre-reacted, and thereafter, the compound (b) and the compound (d) are separately added or added after blending or reaction; and a method in which the compound (a), the compound (b) and the compound (c) are pre-blended or pre-reacted, and thereafter, the compound (d) is added.

The reaction or blending temperature and time are not critical as far as the components are sufficiently mixed. An excessively high temperature and an excessively long period of time unfavorably make the casting operation difficult because undesirable reaction between the starting materials and additives is induced to increase the viscosity. The reaction or blending temperature is about −20 to 100° C., preferably −10 to 80° C., more preferably −5 to 70° C. The blending time is one minute to 24 h, preferably five minutes to 10 h, and more preferably 10 min to 8 h.

The degasification under reduced pressure prior to the mixing, during the mixing or after the mixing of the starting materials and additives is preferred to prevent the generation of bubbles during the subsequent casting step and curing step by polymerization. The degree of evacuation is about 0.1 to 700 mmHg, preferably 10 to 300 mmHg. To increase the quality of the optical material of the invention, it is preferred to remove impurities by filtering the composition before casting into a mold through a micro filter having a pore size of about 0.1 to 5 μm.

The curing time is 0.1 to 200 h, preferably 1 to 100 h. The curing temperature is −10 to 160° C., preferably −10 to 140° C. The polymerization is carried out by keeping the starting mixture at a given polymerization temperature for a given period of time while raising the temperature at 0.1 to 100° C./h, lowering the temperature at 0.1 to 100° C./h or using a combination thereof. After curing, it is preferred to anneal the optical material at 50 to 150° C. for 10 min to 5 h because the strain of the optical material can be removed. The optical material may be further subjected to surface treatment for improving dyeability, providing hard coating and impact resistance coating, and imparting non-reflection or non-fogging properties.

The present invention will be described in more detail by reference to the following examples which should not be construed to limit the scope of the invention thereto. The evaluation of polymerization products was carried out in the following manners.

Refractive Index (nD):
 Measured at 25° C. using Abbe refractometer.

Impact Resistance:
 Iron balls were dropped to a flat plate having a thickness of 2.5 mm from the height of 127 cm while increasing the weight of the ball from 10 g with an increment of 10 g until the plate was broken. The impact resistance was expressed as the impact energy required to break the plate.

Processability:
 A flat plate of 2.5 mm thick was drilled to form a hole of 2 mm diameter at a rotation speed of 2500 rpm and an insert speed of 600 mm/min. The periphery of the hole was observed and the results were evaluated by the following ratings.
 Good: No chipping was observed at the periphery.
 Poor: Chipping occurred at the periphery.

EXAMPLE 1

With 100 parts by weight of mixture consisting of 59 parts by weight of bis(β-epithiopropyl) sulfide (compound (a)), 15 parts by weight of m-xylylene diisocyanate (compound (b)), 20 parts by weight of bis(2-mercaptoethyl) sulfide (compound (c)) and 6 parts by weight of sulfur (compound (d)), 0.1 part by weight of tetrabromophosphonium bromide (catalyst), 0.1 part by weight of 2-(2-hydroxy-5-tert-octylphenyl)benzotriazole (ultraviolet absorber) and 0.1 part by weight of 2,6-di-tert-butyl-4-methylphenol were blended under stirring at room temperature to obtain a uniform liquid. The resultant composition was cast into a mold for lens and cured by polymerization in an oven by raising the temperature from 10° C. to 120° C. over 22 h to prepare a lens. The obtained lens had a high impact resistance, and showed excellent tone, dyeability, heat resistance and oxidation resistance. The lens was also excellent in optical properties and physical properties, and showed an excellent surface condition with little striae or surface deformation. The properties of the prepared lens are shown in Table 1.

EXAMPLE 2

A mixture of 15 parts by weight of 1,3-bis(isocyanatomethyl)cyclohexane (compound (b)), 19 parts by weight of 2,5-bis(isocyanatomethyl)-1,4-dithiane (compound (c)) and 0.03 part by weight of di-n-butyltin diacetate was subjected to pre-reaction at 60° C. for 5 h. After adding 63 parts by weight of bis(β-epithiopropyl) sulfide (compound (a)), 6 parts by weight of sulfur (compound (d)) to the resultant product, 0.1 part by weight of tetrabromophosphonium bromide (catalyst), 0.1 part by weight of 2-(2-hydroxy-5-tert-octylphenyl)benzotriazole (ultraviolet absorber) and 0.1 part by weight of 2,6-di-tert-butyl-4-methylphenol were blended under stirring at room temperature to obtain a uniform liquid. The resultant composition was cast into a mold for lens and cured by polymerization in an oven by raising the temperature from 10° C. to 120° C. over 22 h to prepare a lens. The obtained lens had a high impact resistance, and showed excellent tone, dyeability, heat resistance and oxidation resistance. The lens was also excellent in optical properties and physical properties, and showed an excellent surface condition with little striae or surface deformation. The properties of the prepared lens are shown in Table 1.

EXAMPLES 3–20

The polymerization curing procedure of Example 2 was repeated except for changing the chemical composition and the catalyst as shown in Table 1. The pre-reaction of the compound (b) and the compound (c) was carried out in the presence of di-n-butyltin diacetate as the pre-reaction catalyst. In the examples where di-n-butyltin diacetate was not used, a pre-blend of he compound (b) and the compound (c) was used. In any of the examples, the obtained lens had a high impact resistance, and showed excellent tone, dyeability, heat resistance and oxidation resistance. The lens was also excellent in optical properties and physical properties, and showed an excellent surface condition with little striae or surface deformation. The properties of the prepared lens are shown in Table 1.

COMPARATIVE EXAMPLE 1

The procedure of Example 1 was repeated except for using 100 parts by weight of bis(β-epithiopropyl) sulfide (compound (a)). The results are shown in Table 2. The impact resistance was poor because the compounds (b), (c) and (d) were not used.

COMPARATIVE EXAMPLE 2

The procedure of Example 1 was repeated except for using 70 parts by weight of bis(β-epithiopropyl) sulfide (compound (a)) and 30 parts by weight of m-xylylene diusocyanate (compound (b)). The results are shown in Table 2. The impact resistance was low because the compounds (c) and (d) were not used.

COMPARATIVE EXAMPLE 3

The procedure of Example 1 was repeated except for using 70 parts by weight of bis(β-epithiopropyl) sulfide (compound (a)) and 30 parts by weight of bis(2-mercaptoethyl) sulfide (compound (c)). The results are shown in Table 2. The heat resistance was poor because the compounds (b) and (d) were not used.

COMPARATIVE EXAMPLE 4

The procedure of Example 1 was repeated except for using 90 parts by weight of bis(β-epithiopropyl) sulfide (compound (a)) and 10 parts by weight of sulfur (compound (d)). The results are shown in Table 2. The impact resistance was poor because the compounds (b) and (c) were not used.

COMPARATIVE EXAMPLE 5

The procedure of Example 1 was repeated except for using 52 parts by weight of m-xylylene diisocyanate (compound (b)) and 48 parts by weight of 1,3-bis[(2-mercaptoethyl)thio]-3-mercaptopropane. The results are shown in Table 2. The refractive index and Abbe's number were low because the compounds (a) and (d) were not used.

COMPARATIVE EXAMPLE 6

The procedure of Example 1 was repeated except for using 20 parts by weight of bis(β-epithiopropyl) sulfide (compound (a)), 38 parts by weight of m-xylylene diisocyanate (compound (b)) and 42 parts by weight of bis(2-mercaptoethyl) sulfide (compound (c)). The results are shown in Table 2. The refractive index was low because the compound (d) was not used.

COMPARATIVE EXAMPLE 7

The procedure of Example 1 was repeated except for using 49 parts by weight of m-xylylene diisocyanate (compound (b)), 46 parts by weight of 1,2-bis[(2-mercaptoethyl)thio]-3-mercaptopropane and 5 parts by weight of sulfur (compound (d)). The results are shown in Table 2. The refractive index and Abbe's number were low because the compound (a) was not used.

TABLE 1

| Examples | Chemical Composition (by weight) | | | | Catalyst |
|---|---|---|---|---|---|
| | (a) | (b) | (c) | (d) | |
| 1 | BES (59) | XDI (15) | DMMD (20) | S (6) | TBPB (0.1) |
| 2 | BES (63) | BIC (11) | DMMD (19) | S (7) | TBPB (0.1) BTA (0.03) |
| 3 | BES (43) | BIND (21) | DMMD (29) | S (7) | TBPB (0.1) BTA (0.05) |
| 4 | BES (50) | BIND (10) | DMMD (15) | S (25) | TBPB (0.1) BTA (0.05) |
| 5 | BES (70) | NBDI (11) | BMT (14) | S (5) | TBPB (0.1) BTA (0.03) |
| 6 | BES (66) | XDIT (18) | BMES (12) | S (4) | TBPB (0.1) |
| 7 | BES (63) | BIC (12) | BMES (1) DMMD (17) | S (7) | TBPB (0.1) BTA (0.03) |
| 8 | BES (64) | XDI (11) | BMES (19) | Se (6) | TBPB (0.1) |
| 9 | BES (63) | XDI (15) | PETP (15) | SSe (7) | TBPB (0.1) |
| 10 | BED (65) | NBDI (13) | BMT (17) | S (5) | TBPB (0.1) BTA (0.03) |
| 11 | BED (60) | XDI (15) | BMT (20) | S (5) | TBPB (0.1) |
| 12 | BED (60) | XDI (10) | BMT (15) | S (15) | TBPB (0.1) |
| 13 | BED (45) | BIND (21) | DMMD (29) | S (5) | TBPB (0.1) BTA (0.05) |
| 14 | BED (55) | BIND (10) | DMMD (20) | S (15) | TBPB (0.1) BTA (0.05) |
| 15 | BED (55) | XDI (20) | PETP (20) | S (5) | TBPB (0.1) BTA (0.04) |
| 16 | BESe (60) | BIC (15) | BMT (20) | S (5) | TBPB (0.1) BTA (0.03) |
| 17 | BESe (45) | BIND (21) | DMMD (29) | S (5) | TBPB (0.1) BTA (0.05) |
| 18 | BESe (63) | BIND (10) | PETP (23) | SPb (4) | TBPB (0.1) BTA (0.03) |
| 19 | BESe (56) | BIND (17) | DMMD (23) | CS2 (4) | TBPB (0.1) BTA (0.03) |
| 20 | BDS (76) | XDI (7) | BMES (13) | S (4) | TBPB (0.1) |

| Examples | Refractive Index/ Abbe's Number nD/υD | Impact Resistance (J) | Processability |
|---|---|---|---|
| 1 | 1.70/34 | 3.9 | good |
| 2 | 1.70/36 | 4.3 | good |
| 3 | 1.70/35 | 4.2 | good |
| 4 | 1.75/31 | 3.5 | good |
| 5 | 1.70/36 | 3.2 | good |
| 6 | 1.72/32 | 3.5 | good |
| 7 | 1.70/36 | 4.5 | good |
| 8 | 1.70/35 | 3.2 | good |
| 9 | 1.69/35 | 3.2 | good |
| 10 | 1.72/34 | 3.5 | good |
| 11 | 1.72/32 | 3.3 | good |
| 12 | 1.75/30 | 3.3 | good |
| 13 | 1.72/34 | 3.3 | good |
| 14 | 1.75/31 | 3.3 | good |
| 15 | 1.69/34 | 3.4 | good |
| 16 | 1.71/34 | 3.4 | good |
| 17 | 1.72/34 | 3.5 | good |
| 18 | 1.70/35 | 3.2 | good |
| 19 | 1.72/34 | 3.3 | good |
| 20 | 1.74/31 | 3.5 | good |

Abbreviations:
BES: Bis(β-epithiopropyl) sulfide
BED: Bis(β-epithiopropyl) disulfide
BESe: Bis(β-epithiopropyl) selenide
BDS: Bis(β-epidithiopropyl) sulfide
XDI: m-Xylylene diisocyanate
BIC: 1,3-Bis (isocyanatomethyl)cyclohexane
NBDI: 2,5-Bis(isocaynatomethyl)norbornene
BIND: 2,5-Bis(isocyanatomethyl)-1,4-dithiane
XDIT: m-Xylylene dithioisocyanate
BMES: Bis(2-mercaptoethyl) sulfide
DMMD: 2,5-Dimercaptomethyl-1,4-dithiane
PETP: Pentaerythritol tetramercaptopropionate
BMT: 1,2-Bis[(2-mercaptoethyl)thio]-3-mercaptopropane
S: Sulfur
Se: Selenium
Sse: Selenium sulfide
SPb: Lead selenide
CS2: Carbon disulfide
TBPB: Tetra-n-butylphosphonium bromide
BTA: Di-n-butyltin diacetate

TABLE 2

| Comparative Examples | Chemical Composition (by weight) | | | | |
|---|---|---|---|---|---|
| | (a) | (b) | (c) | (d) | Catalyst |
| 1 | BES (100) | | | | TBPB (0.1) |
| 2 | BES (70) | XDI (30) | | | TBPB (0.1) |
| 3 | BES (70) | | BMES (30) | | TBPB (0.1) |
| 4 | BES (90) | | | S (10) | TBPB (0.1) |
| 5 | | XDI (52) | BMT (48) | | BTA (0.1) |
| 6 | BDS (20) | XDI (38) | DMMD (42) | | TBPB (0.1) BTA (0.05) |
| 7 | | XDI (49) | BMT (46) | S (5) | BTA (0.1) |

| Comparative Examples | Refractive Index/ Abbe's Number nD/υD | Impact Resistance (J) | Processability |
|---|---|---|---|
| 1 | 1.71/36 | 1.6 | poor |
| 2 | 1.68/34 | 2.6 | poor |
| 3 | 1.71/36 | 1.9 | good |
| 4 | 1.72/35 | 1.2 | poor |
| 5 | 1.66/32 | 4.5 | good |
| 6 | 1.63/30 | 1.8 | poor |
| 7 | 1.67/32 | 3.6 | good |

Abbreviations:
BES: Bis(β-epithiopropyl) sulfide
BDS: Bis(β-epidithiopropyl) sulfide
XDI: m-Xylylene diisocyanate
BMES: Bis(2-mercaptoethyl) sulfide
DMMD: 2,5-Dimercaptomethyl-1,4-dithiane
BMT: 1,2-Bis[(2-mercaptoethyl)thio]-3-mercaptopropane
S: Sulfur
TBPB: Tetra-n-butylphosphonium bromide
BTA: Di-n-butyltin diacetate

INDUSTRIAL APPLICABILITY

The optical material obtained by polymerization curing the composition of the present invention can provide an optical resin that is balanced with a sufficiently high refractive index and a good Abbe's number with a high impact resistance which cannot be attained by using the known materials.

What is claimed is:

1. A composition for optical materials, comprising:
   (a) a compound having in one molecule at least one structure represented by the following Formula 1:

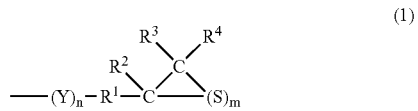

wherein $R^1$ is a single bond or a $C_{1-10}$ hydrocarbon group, each of $R^2$, $R^3$ and $R^4$ is a $C_{1-10}$ hydrocarbon group or hydrogen, Y is O, S, Se or Te, m is 1 to 5, and n is 0 to 5;
   (b) a compound having in one molecule at least one isocyanate group and/or isothiocyanate group;
   (c) a compound having in one molecule at least one mercapto group; and
   (d) an inorganic compound having sulfur atom and/or selenium atom, wherein the compound (d) is sulfur, carbon disulfide, selenium, lead selenide or selenium sulfide.

2. The composition for optical materials according to claim 1, wherein the compound (a) is represented by the following Formula 2:

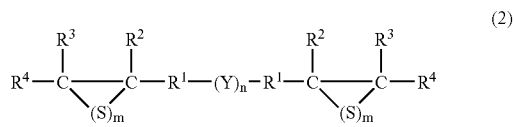

wherein $R^1$ is a single bond or a $C_{1-10}$ hydrocarbon group, each of $R^2$, $R^3$ and $R^4$ is a $C_{1-10}$ hydrocarbon group or hydrogen, Y is O, S, Se or Te, m is 1 to 5, and n is 0 to 5.

3. The composition for optical materials according to claim 1, wherein the compound (a) is represented by Formula 1 wherein Y is S or Se, m is 1, and n is 0 to 2.

4. The composition for optical materials according to claim 2, wherein the compound (a) is represented by Formula 2 wherein Y is S or Se, m is 1, and n is 0 to 2.

5. The composition for optical materials according to claim 1, wherein the compound (c) has a sulfide linkage.

6. The composition for optical materials according to claim 2, wherein the compound (c) has a sulfide linkage.

7. An optical material produced by polymerization curing the composition as defined in claim 1.

8. An optical material produced by polymerization curing the composition as defined in claim 2.

9. An optical lens comprising the optical material as defined in claim 7.

10. An optical lens comprising the optical material as defined in claim 8.

11. A method of producing an optical material, comprising a step of polymerization curing the composition as defined in claim 1.

12. A method of producing an optical material, comprising a step of polymerization curing the composition as defined in claim 2.

13. The composition for optical materials according to claim 1, wherein a total amount of the compound (a) and the inorganic compound (d) included in the composition is 5 to 95 parts by weight.

14. The composition for optical materials according to claim 13, wherein a total amount of the compound (b) and the compound (c) is 5 to 95 parts by weight.

15. The composition for optical materials according to claim 1, wherein a total amount of the compound (b) and the compound (c) is 5 to 95 parts by weight.

16. The composition for optical materials according to claim 1, wherein the total amount of the compound (a) and the inorganic compound (d) is 20 to 90 parts by weight, and the total amount of the compound (b) and the compound (c) is 10 to 90 parts by weight.

* * * * *